(12) United States Patent
Hidai et al.

(10) Patent No.: US 7,418,312 B2
(45) Date of Patent: Aug. 26, 2008

(54) ROBOT APPARATUS AND WALKING CONTROL METHOD THEREOF

(75) Inventors: Kenichi Hidai, Tokyo (JP); Kohtaro Sabe, Tokyo (JP)

(73) Assignee: Sony Corporation, Tokyo (JP)

( * ) Notice: Subject to any disclaimer, the term of this patent is extended or adjusted under 35 U.S.C. 154(b) by 763 days.

(21) Appl. No.: 10/934,366

(22) Filed: Sep. 7, 2004

(65) Prior Publication Data

US 2005/0066397 A1  Mar. 24, 2005

(30) Foreign Application Priority Data

Sep. 19, 2003  (JP)  ............................. 2003-329131

(51) Int. Cl.
*G06F 19/00* (2006.01)
(52) U.S. Cl. ...................... 700/245; 700/250; 700/253; 700/258; 700/259; 318/568.16; 318/568.12
(58) Field of Classification Search ................ 700/245, 700/250, 253, 258, 259; 318/568.16, 568.12
See application file for complete search history.

(56) References Cited

U.S. PATENT DOCUMENTS 6,374,155 B1 * 4/2002 Wallach et al. .............. 700/245
6,534,943 B1 * 3/2003 Hornby et al. ......... 318/568.12

* cited by examiner

*Primary Examiner*—Khoi H. Tran
*Assistant Examiner*—Marie A Weiskopf
(74) *Attorney, Agent, or Firm*—Oblon, Spivak, McClelland, Maier & Neustadt, P.C.

(57) ABSTRACT

An object of the present invention is to provide a robot apparatus and a walking control method thereof capable of changing walking control modes in accordance with floor surfaces by discriminating states of the floor surfaces for walking without modifying a step-based walking schedule and capable of providing stable walking even if floor surface states change greatly.

A robot apparatus comprises: an action control section 11 to output a walking start instruction; a floor surface discrimination section 12 to discriminate a category for a current floor surface; and a walking control section 13 to compute an adaptive operation amount. The walking control section 13 obtains sensor values of a foot sole sensor and the like from the current floor surface by means of an in-place stepping motion and the like. Based on the sensor value, the walking control section 13 computes the adaptive operation amount as a correction amount from a standard gait model. The floor surface discrimination section 12 performs pattern recognition for the adaptive operation amount to discriminate the category for the current floor surface. The walking control section 13 is supplied with the floor surface category and selects an optimum walking model for the floor surface category. Again from the sensor value, the walking control section 13 computes the adaptive operation amount as a correction amount for the sensor value and provides walking control accordingly.

26 Claims, 18 Drawing Sheets

Carpet
(pile length of shorter than 6 mm)

Carpet
(pile length of longer than or equal to 6 mm)

ROBOT APPARATUS AND WALKING CONTROL METHOD THEREOF

BACKGROUND OF THE INVENTION

1. Field of the Invention

The present invention relates to an autonomously movable legged mobile robot apparatus and a walking control method of the robot apparatus. More particularly, the present invention relates to a robot apparatus and its walking control method capable of locomotion on such areas as floors whose surface states for walking greatly vary.

This application claims priority of Japanese Patent Application No. 2003-329131, filed on Sep. 19, 2003, the entirety of which is incorporated by reference herein.

2. Description of the Related Art

A term "robot" refers to a mechanical apparatus that simulates motions of human beings (creatures) by using electric or magnetic actions. In Japan, robots began to spread at the end of 1960s. Many of them were industrial robots such as manipulators and transfer robots for automating and unmanned manufacturing works in factories.

Recently, practical robots are being developed as partners of human beings to assist in their life, i.e., human activities for living conditions and the other various situations in daily life. Unlike the industrial robots, the practical robots have capabilities to self-learn the method of adaptation to human beings having different individual characteristics or to diverse environments in various aspects of living environments for human beings. For example, robot apparatuses that are already put to practical use include "pet-type" robots and "human-type" or "human-like" robots (humanoid robots). The pet-type robots simulate the body mechanism and motions of quadrupedal walking animals such as dogs and cats. The humanoid robots are designed and modeled on the body mechanism and motions of bipedal upright walking human beings and the like.

Compared to industrial robots, the practical robots also referred to as entertainment robots because they are capable of various entertainment-oriented motions, for example. Such robot apparatuses are equipped with imaging means such as cameras and various sensors to obtain information from the outside and can autonomously behave in accordance with the external information (external stimulus) and internal states of the robots themselves.

These robot apparatuses include legged mobile ones such as bipedal walking robot apparatuses. It is particularly difficult for a bipedal walking robot apparatus to walk on a floor surface having, e.g., slopes and obstructions by balancing the whole body under actual environments. Normally, robot walking is made possible by computing control signals to be output to an actuator provided for each joint based on floor reaction forces, joint angles, and the like obtained from sensors and the like provided for foot soles.

For example, patent document 1: Japanese Patent Application Laid-Open No. 2001-328083 discloses the technology of a floor shape estimation apparatus for a legged mobile robot apparatus that walks by simultaneously estimating a landing surface inclination for a foot and a height difference between landing surfaces for both feet.

The technology described in the above-mentioned patent document 1 enables smooth walking by estimating local shapes of the floor surface. However, there is provided no information about the floor surface until the feet actually touch the floor. Such scheme simply modifies a very short walking schedule.

That is to say, it is possible to adaptively compute correction amounts (adaptive operation amounts) of trajectories each time the feet touch the floor surface. However, it is impossible to obtain knowledge about the floor surface at every step before the foot touches the floor. Further, it is impossible to automatically discriminate an optimal control mode for the floor surface by supposing not the step-based area but the larger area (of the floor surface) during the walking control. An adaptive operation amount needs to be computed based on predetermined control modes. The adaptive operation amount in the above-mentioned patent document 1 and the like signifies a correction amount corresponding to floor surface's inclinations and robot's attitudes against a walking control model defined as a given reference. Accordingly, it is possible to continuously or slowly change the control contents of the walking control model. There occurs a problem of making the walking difficult in cases that cannot be solved by such adaptive operation only.

For example, the robot apparatus may walk on hard landing surfaces (floor surfaces) such as flooring, marble stone, and concrete or on soft landing surfaces such as carpets and lawn. In these cases, there are used completely different parameters, coefficients, or walking algorithms (walking models) for computing adaptive operation amounts corresponding to the current floor surface, for example, from a walking control model as the walking control mode used as the reference. Without changing the walking control mode, simply computing the adaptive operation amount cannot allow locomotion between greatly varying floor surface states, for example, from the hard landing surface to the soft landing surface. During such locomotion, the robot apparatus itself cannot even discriminate whether or not the walking is possible. An operator needs to manually reconfigure knowledge about the floor surface. Specifically, it has been necessary to reconfigure parameters for computing adaptive operation amounts corresponding to the floor surface, for example.

SUMMARY OF THE INVENTION

The present invention has been made in consideration of the foregoing. It is therefore an object of the present invention to provide a robot apparatus and a walking control method thereof capable of changing walking control modes in accordance with floor surfaces by discriminating states of the floor surfaces for walking without modifying a step-based walking schedule and capable of providing stable walking even if floor surface states change greatly.

In order to achieve the above-mentioned objects, the present invention provides an autonomously movable legged mobile robot apparatus comprising: a walking surface discrimination means for discriminating a walking surface category as a current walking surface's category from a plurality of prepared categories based on information about the current walking surface; and a walking control means for controlling walking by selecting a specified walking control mode in accordance with the walking surface category discriminated by the walking surface discrimination means.

The present invention differs from a conventional method of adaptively computing correction amounts for a walking model during walking. The present invention discriminates a floor surface state based on prepared floor surface categories. According to a discrimination result, the present invention selects a specified walking control mode and makes it possible to control walking in accordance with an optimum walking control mode for the floor surface.

The walking control means computes a walking control amount from a sensor value output from a sensor provided for at least a leg based on a selected walking control mode. The walking surface discrimination means can use the walking control amount as information about the current walking surface. When the leg has joints and the like, the sensor detects angles of the joints or detects a foot sole's reaction force from the walking surface. A walking control amount is converted from various sensor values and includes information about the floor surface at that time. The waking control amount can be used for the floor surface category discrimination.

Further, the walking control means has a different walking control model for each of the categories, selects a walking control model corresponding to the walking surface category to be input, and uses the sensor value to compute a correction amount from the walking control model as the walking control amount. The walking control means converts the sensor value into the walking control amount using a specified parameter, has a different parameter for each of the categories, and can compute the walking control amount using a parameter corresponding to the walking surface category to be input. This makes it possible to compute a walking control amount by selecting an optimum walking control model or an optimum parameter in accordance with the input floor surface category. As a result, stable walking is made possible.

Moreover, the walking surface discrimination means uses a sensor value output from a sensor provided for at least a leg as information about the current walking surface. There is provided an imaging means. The walking surface discrimination means extracts a walking surface area from an input image captured by the imaging means and uses the walking surface area as information about the current walking surface. The sensor values and the floor surface area contain information about the current floor surface and the information can be used for the floor surface category discrimination.

The walking surface discrimination means discriminates a walking surface category by means of pattern recognition of information about the current walking surface. For example, the floor surface discrimination means has a learnt characteristic amount obtained by previously learning a characteristic amount of information about the floor surface for each category classified in accordance with a specified criterion and can compare a characteristic amount of information about the current floor surface with the learnt characteristic amount so as to discriminate a floor surface category. Various floor surfaces are classified into floor surface categories considered to be necessary and can be learnt thereafter.

Furthermore, the plurality of categories are obtained by classifying characteristic amounts of information about walking surfaces based on a previously learnt characteristic amount. The walking surface discrimination means can compare a characteristic amount of information about a current walking surface with the learnt characteristic amount to discriminate a walking surface category. It may be preferable to classify the floor surface categories according to characteristic amounts obtained from floor surfaces.

Still further, there is provided a motion generation means for generating an in-place stepping motion to discriminate the walking surface category. The walking control means computes a walking control amount from a sensor value output from a sensor provided for at least a leg based on a selected walking control mode during the in-place stepping motion. The walking surface discrimination means may use the walking control amount as information about the walking surface. In-place stepping motions can be used to discriminate the floor surface categories before walking.

The walking surface discrimination means can continuously discriminate a walking surface category during walking. Since the floor surface categories are always discriminated during walking, stable walking becomes available even if floor surface conditions vary greatly.

The present invention provides a walking control method of an autonomously movable legged mobile robot apparatus comprising the steps of: discriminating a walking surface category as a current walking surface's category from a plurality of categories based on information about the current walking surface; and controlling waling by selecting a specified walking control mode in accordance with the walking surface category discriminated by the walking surface discrimination step.

The present invention discriminates a current walking surface category using the following inputs: a walking control amount that is computed according to walking surfaces such as a current floor surface and is used as a correction amount from a walking control model as the standard; sensor values from sensors provided for a foot sole, a joint, and the like; or information about the walking surface such as a walking surface area included in an input image. According to this discrimination result, a walking control mode is selected for walking control to control the walking. Therefore, the walking surface state is recognized as a walking surface category in advance, and then the walking control can be provided. There may be a case of walking between areas whose walking surface states vary greatly. Particularly in such case, the present invention can provide the robot apparatus and its walking control method capable of providing much more stable walking control than the conventional walking control method by making corrections as needed while walking.

DETAILED DESCRIPTION OF THE PREFERRED EMBODIMENTS

An embodiment of the present invention will be described in detail with reference to the accompanying drawings. The embodiment is applied to a robot apparatus that provides operation control so as to allow part of the apparatus and the like to contact with objects.

The embodiment describes a bipedal walking robot apparatus as an example. It is to be distinctly understood that the embodiment can be applied to not only bipedal walking robot apparatuses, but also robot apparatuses capable of locomotion by means of four legs, wheels, and the like. First, the bipedal walking robot apparatus will be described. Then, a method of controlling the walking of such robot apparatus will be described.

(1) Robot Apparatus

Figure 1:
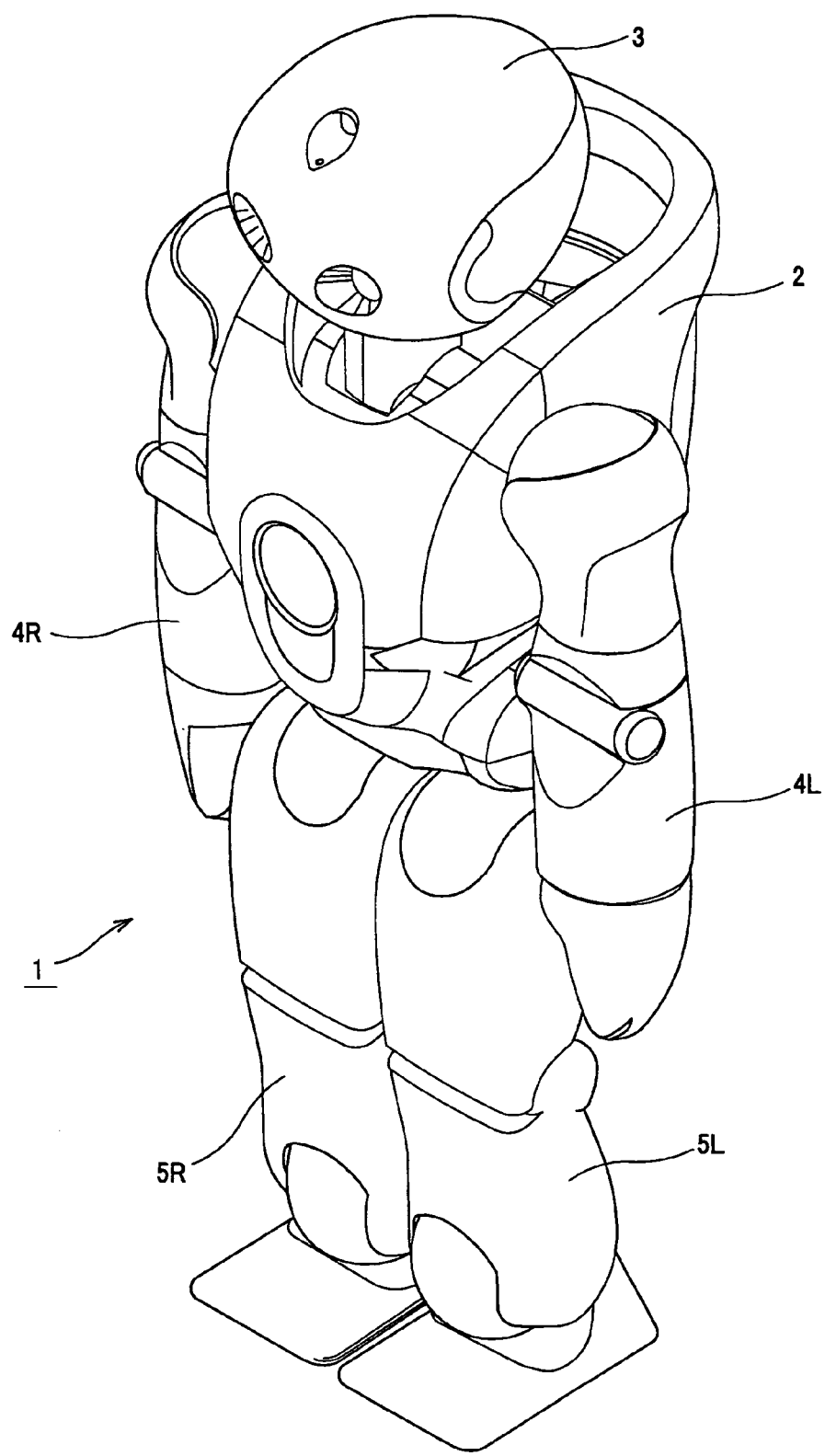
FIG. 1 is a perspective view outlining a robot apparatus according to an embodiment of the present invention.

The humanoid robot apparatus is a practical robot that assists in human activities for living conditions and the other various situations in daily life. The robot apparatus is also an entertainment robot that can behave in accordance with internal states (anger, sadness, joy, pleasure, and the like) and represent basic human motions. FIG. 1 is a perspective view outlining a robot apparatus according to the embodiment of the present invention.

As shown in FIG. 1, a robot apparatus 1 comprises a head unit 3, right and left arm units 4R/L, and right and left leg units 5R/L coupled to specified positions of a torso unit 2. In these reference symbols, letters R and L are suffixes to indicate right and left, respectively. The same applies to the description below.

Figure 2:
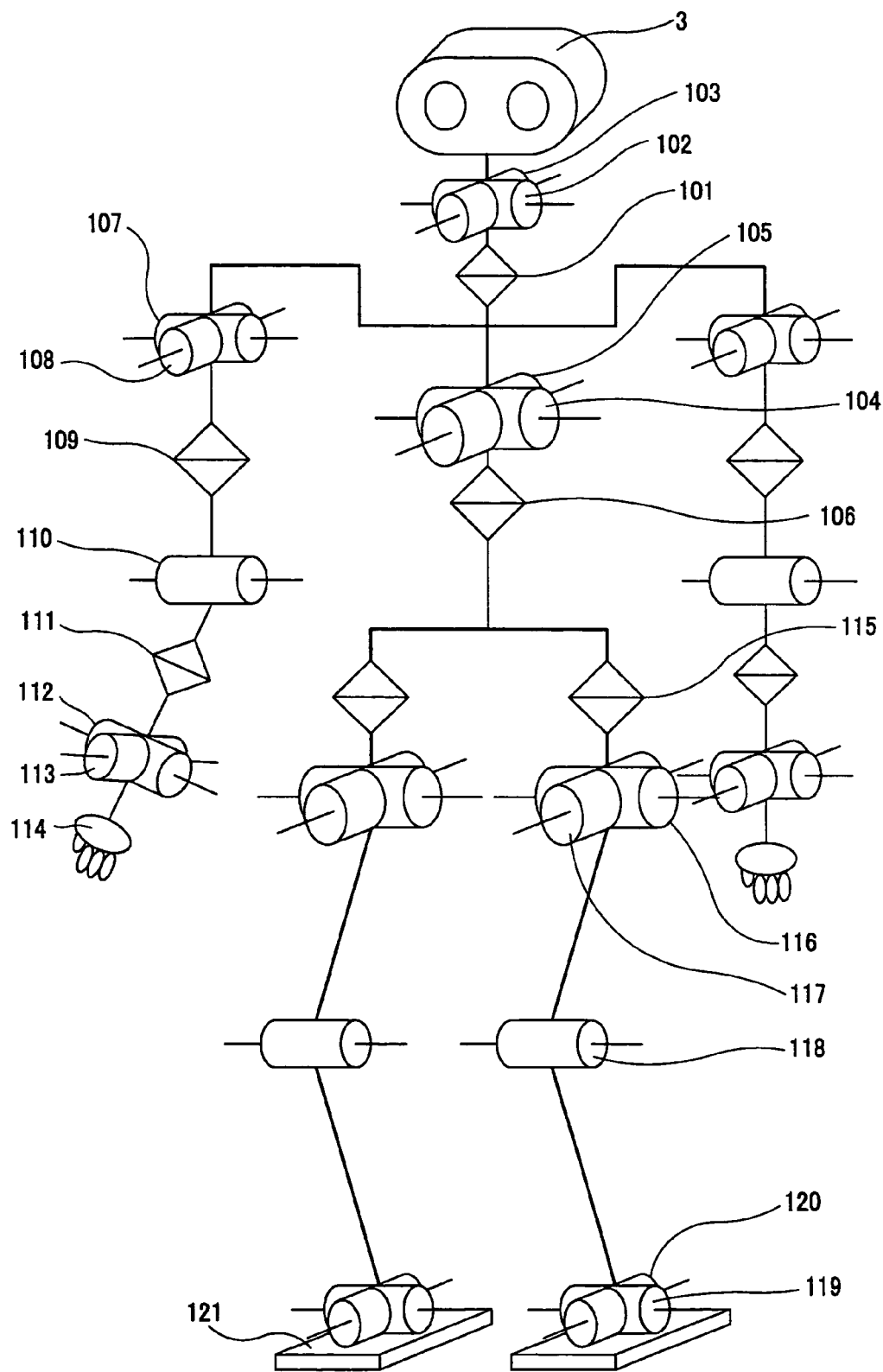
FIG. 2 schematically shows a configuration of joint freedom degrees provided for the robot apparatus.

FIG. 2 schematically shows a configuration of joint freedom degrees provided for the robot apparatus 1. A neck joint supporting the head unit 3 has three freedom degrees: a neck joint yaw axis 101, a neck joint pitch axis 102, and a neck joint roll axis 103.

Each of the arm units 4R/L constituting upper limbs comprises: a shoulder joint pitch axis 107; a shoulder joint roll axis 108; an upper arm yaw axis 109; an elbow joint pitch axis 110; a lower arm yaw axis 111; a wrist joint pitch axis 112; a wrist joint roll axis 113; and a hand section 114. The hand section 114 is actually a multi-joint, multi-freedom-degree structure including a plurality of fingers. However, operations of the hand section 114 have little influence on attitudes and walking control of the robot apparatus 1. For simplicity, this specification assumes that the hand section 114 has zero freedom degree. Accordingly, each arm unit has seven freedom degrees.

The torso unit 2 has three freedom degrees: a torso pitch axis 104, a torso roll axis 105, and a torso yaw axis 106.

Each of leg units 5R/L constituting lower limbs comprises: a crotch joint yaw axis 115, a crotch joint pitch axis 116, a crotch joint roll axis 117, a knee joint pitch axis 118, an ankle joint pitch axis 119, an ankle joint roll axis 120, and a foot section 121. This specification defines an intersecting point between the crotch joint pitch axis 116 and the crotch joint roll axis 117 to be a crotch joint position of the robot apparatus 1. A human body equivalent for the foot section 121 is a structure including a multi-joint, multi-freedom-degree foot sole in reality. For simplicity, the specification assumes that the foot sole of the robot apparatus 1 has zero freedom degree. Accordingly, each leg unit has six freedom degrees.

To sum up, the robot apparatus 1 as a whole has 32 freedom degrees (3+7×2+3+6×2) in total. However, the entertainment-oriented robot apparatus 1 is not limited to having 32 freedom degrees. Obviously, it is possible to increase or decrease freedom degrees, i.e., the number of joints according to design or production conditions, requested specifications, and the like.

Actually, an actuator is used to realize each of the above-mentioned freedom degrees provided for the robot apparatus 1. It is preferable to use small and lightweight actuators chiefly in consideration for eliminating apparently unnecessary bulges to approximate a natural human shape and providing attitude control for an unstable bipedal walking structure.

Figure 3:
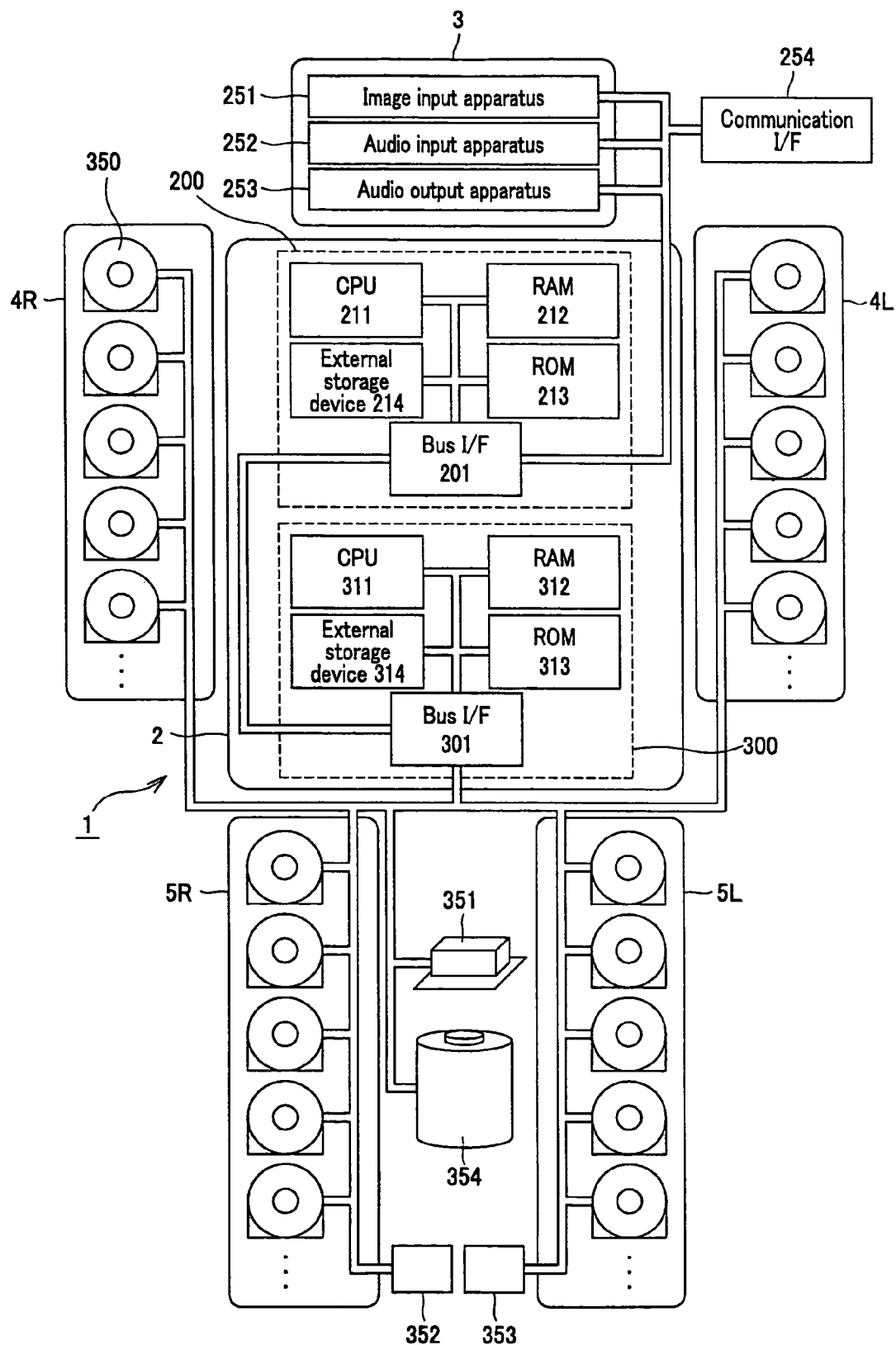
FIG. 3 schematically shows a control system configuration of the robot apparatus.

For example, the above-mentioned robot apparatus provides the torso unit 2 with a control system to control operations of the entire robot apparatus. FIG. 3 schematically shows a control system configuration of the robot apparatus 1. As shown in FIG. 3, the control system comprises a reasoning control module 200 and a kinetic control module 300. The reasoning control module 200 controls affectional discrimination and emotional expressions in dynamic response to user inputs and the like. The kinetic control module 300 controls the entire body's coordinated movement of the robot apparatus 1 such as driving of an actuator 350.

The reasoning control module 200 comprises a CPU (Central Processing Unit) 211 to perform computing processes concerning affectional discrimination and emotional expressions, RAM (Random Access Memory) 212, ROM (Read Only Memory) 213, an external storage device (hard disk drive and the like) 214, and the like. The reasoning control module 200 is an independently driven information processing unit capable of self-complete processes within the module.

The reasoning control module 200 is supplied with image data from an image input apparatus 251, audio data from an audio input apparatus 252, and the like. In accordance with these stimuli from the outside, the reasoning control module 200 determines the current emotion or intention of the robot apparatus 1. The image input apparatus 251 has a plurality of CCD (Charge Coupled Device) cameras, for example. The audio input apparatus 252 has a plurality of microphones, for example.

The reasoning control module 200 issues an instruction to the kinetic control module 300 so as to perform a motion or action sequence based on the decision making, i.e., movement of limbs.

The kinetic control module 300 comprises a CPU (Central Processing Unit) 311 to control entire body's coordinated movement of the robot apparatus 1, RAM 312, ROM 313, an external storage device (hard disk drive and the like) 314, and the like. The kinetic control module 300 is an independently driven information processing unit capable of self-complete processes within the module. The external storage device 314 can store, for example, offline computed walking patterns, targeted ZMP trajectories, and the other action schedules.

The kinetic control module 300 connects with: the actuator 350 to realize each of freedom degrees distributed to the whole body of the robot apparatus 1 shown in FIG. 2; a distance measurement sensor (not shown) to measure the distance to an object; an attitude sensor 351 to measure an attitude or inclination of the torso unit 2; landing confirmation sensors 352 and 353 to detect whether left and right foot soles leave from or touch the floor; a load sensor provided for a foot sole 121 of the foot section 121; and a power supply controller 354 to manage power supplies such as batteries. These devices are connected to the kinetic control module 300 via a bus interface (I/F) 301. The attitude sensor 351 comprises a combination of an acceleration sensor and a gyro sensor, for example. The landing confirmation sensors 352 and 353 comprise a proximity sensor, a micro switch, and the like.

The reasoning control module 200 and the kinetic control module 300 are constructed on a common platform. Both are interconnected via bus interfaces 201 and 301.

The kinetic control module 300 controls the entire body's coordinated movement by each of the actuators 350 to realize action instructed from the reasoning control module 200. In response to the action instructed by the reasoning control module 200, the CPU 311 retrieves a corresponding motion pattern from the external storage device 314. Alternatively, the CPU 311 internally generates a motion pattern. According to the specified motion pattern, the CPU 311 configures the foot section movement, ZMP trajectory, torso movement, upper limb movement, waist's horizontal position and height, and the like. The CPU 311 then transfers instruction values to the actuators 350. The command values specify motions corresponding to the configuration contents.

The CPU 311 uses an output signal from the attitude sensor 351 to detect an attitude or inclination of the torso unit 2 of the robot apparatus 1. In addition, the CPU 311 uses output signals from the landing confirmation sensors 352 and 353 to detect whether each of the leg units 5R/L is idling or standing. In this manner, the CPU 311 can adaptively control the entire body's coordinated movement of the robot apparatus 1. Further, the CPU 311 controls attitudes or motions of the robot apparatus 1 so that the ZMP position is always oriented to the center of a ZMP stabilization area.

The kinetic control module 300 notifies the reasoning control module 200 of processing states, i.e., to what extent the kinetic control module 300 has fulfilled the action according to the decision made by the reasoning control module 200. In this manner, the robot apparatus 1 can determine its and surrounding circumstances based on the control program and can behave autonomously.

(2) Walking Control Method

The following describes the walking control method of walking for the above-mentioned robot apparatus 1, i.e., a legged mobile robot apparatus having the walking function. For the walking control, the robot apparatus performs statistic pattern recognition of the information about walking surfaces to discriminate walking surface states and selects an optimum one of predetermined walking control modes corresponding to this discrimination result. Specifically, during walking or stepping in place to be described later, the robot apparatus obtains various sensor information, walking control amounts, image information, and the like as the information about the walking surface. Based on the obtained information, the robot apparatus determines a category of the current walking surface (hereafter referred to as a walking surface category). The robot apparatus selects a walking control mode in accordance with this walking surface category. In this manner, stable walking is realized.

The embodiment defines the floor surface in terms of a plane where the robot apparatus walks, and defines the floor surface category in which the floor surface is categorized. Obviously, it may be preferable to categorize not only the floor surface, but also the other walking surfaces, for example, outdoor ground surfaces, lawn, stair surfaces, and the like where the robot apparatus can walk. An appropriate walking control mode may be selected according to the discrimination result.

As mentioned above, the conventional robot apparatus computes a walking control amount (hereafter referred to as an adaptive operation amount) as a trajectory correction amount from a specified walking control model (motion reproduction) in response to various sensor values such as attitudes and reaction forces during walking to correct the walking control model. In this manner, the robot apparatus performs adaptive control so as to be able to stably walk by maintaining an attitude balance of the robot apparatus in accordance with inclinations and the like of the floor surface where the foot section touches during walking. However, walking becomes impossible under the walking control based on such adaptive operation amount and the like computed from sensor values and the like during walking for locomotion between areas whose floor surface conditions greatly vary, for example, from hard floor surfaces such as flooring, marble, and concrete materials to soft floor surfaces such as a thick-piled carpet and a lawn. This is because the walking control mode used for walking on hard floor surfaces completely differs from that used for walking on soft floor surfaces.

Accordingly, the robot apparatus can respond to continuous and smooth changes under the walking control by computing the adaptive operation amount from various sensor values during walking. However, walking is difficult unless the walking control mode is changed when floor surface conditions drastically change like locomotion from hard floor surfaces to soft floor surfaces.

The inventors found the following as a result of concentrated experiments. The current floor surface is registered to the prepared floor surface category based on various sensor values and the adaptive operation amount obtained in accordance with the floor surface. There is provided a walking control mode corresponding to this floor surface category. The floor surface category for the current floor surface is discriminated to select an optimum walking control mode for the floor surface category. The adaptive operation amount is then computed for walking control. In this manner, the legged mobile robot apparatus can walk well even if floor surface conditions drastically change.

In one case of differing walking control modes, different parameters or coefficients are used to convert or compute the adaptive operation amount from various sensor values. In another case, the walking uses different walking motions (walking control models) or walking algorithms. The adaptive operation amount is a correction value to correct deviation from a targeted control value, e.g., a deviated rotation angle of each actuator. This specification uses a term "gait" to collectively represent waling patterns (walking control models) such as fast or slow walking, and a sequence of motion control values for walking motions such as the above-mentioned adaptive operation amount.

The following describes the robot apparatus's floor-surface-based walking control apparatus capable of adaptive walking control by discriminating floor surface categories, i.e., discriminating to which floor surface category the current floor surface belongs.

Figure 4:
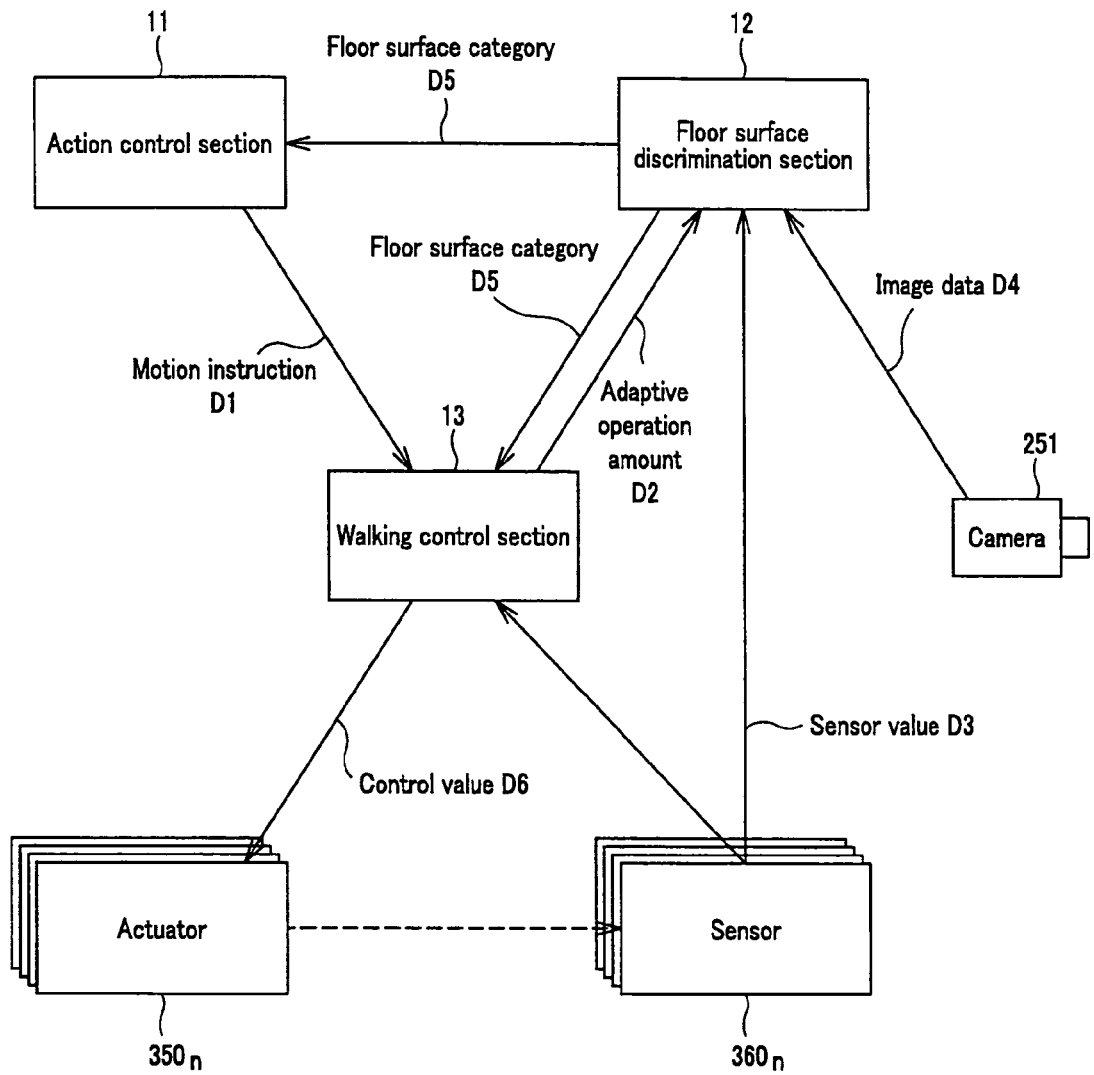
FIG. 4 is a functional block diagram showing only major parts needed for a floor-surface-based walking control apparatus of the robot apparatus.

FIG. 4 is a functional block diagram showing only major parts needed for the floor-surface-based walking control apparatus of the robot apparatus. A floor-surface-based walking control apparatus 10 comprises: an action control section 11 to control robot apparatus actions; a floor surface discrimination section 12 to recognize a floor surface and output a floor surface category; and a walking control section 13 to select a walking control mode and control walking based on action instructions from the action control section 11 and on a floor surface category from the floor surface discrimination section 12.

The action control section 11 selects and executes robot apparatus's actions corresponding to situations. When the action control section 11 issues a motion instruction (walking instruction) D1, the walking control section 13 operates to execute the walking control. Floor surface situations, e.g., whether or not there is an obstruction may become a factor (external stimulus) that affects robot apparatus actions.

The floor surface discrimination section 12 solves statistic pattern recognition problems of the floor surface category to select a floor surface category for the current floor surface out of the prepared floor surface categories. At this time, the floor surface discrimination section 12 is supplied with inputs: amounts of floor surface states sensed by the robot apparatus body such as an adaptive operation amount D2 from the walking control section 13 and output values (sensor values) D3 from various sensors 360; and image data D4 from image input means 251 such as a camera.

In FIG. 4, a sensor $360_n$ represents a potentiometer to detect rotation angles and positions of an actuator $350_n$ provided for each joint, an acceleration sensor to detect an acceleration of the foot section (foot sole) during walking, a force sensor provided for the foot sole to detect a reaction force from the floor surface, and the like. These rotation angles, accelerations, reaction force, and the like are input as sensor values.

The pattern recognition is available the instant that there is supplied input data such as the adaptive operation amount D2, various sensor values D3, the image data D4, and the like. Consequently, it is possible to always continue discriminating floor surface categories while the robot apparatus 1 is walking. A floor surface category D5 as a discrimination result is output to the other components such as the action control section 11, the walking control section 13, and the like.

The walking control section 13 is initiated by a motion instruction D1. The walking control section 13 is supplied with inputs from various sensor values D3 as mentioned above in accordance with a specified walking control mode. The walking control section 13 computes a correction amount from the walking control model in the walking control mode as the adaptive operation amount D2. The walking control section 13 then outputs the adaptive operation amount to the floor surface discrimination section 12. The floor surface discrimination section 12 determines a category for the current floor surface. The walking control section 13 receives the floor surface category D5 to select a walking control mode corresponding to the current floor surface state. The walking control section 13 computes an adaptive operation amount as the correction amount from the walking control model in the selected walking control mode to generate a gait. That is to say, the walking control section 13 is previously provided with walking control modes corresponding to floor surface categories. For example, the walking control modes include a walking model as the reference and coefficients or parameters to convert or compute a correction amount from the walking model by using various sensor values at a given time.

The example here is assumed to select the walking control mode corresponding to the floor surface category, i.e., to select a walking algorithm or a parameter. A walking algorithm is selected, for example, when floor surface categories A and B use greatly different floor surface states and the walking algorithm needs to be changed to a completely different one. A parameter is selected when floor surface categories A and B use the same walking control model and it is necessary to change only a parameter to compute the adaptive operation amount from sensor values. The adaptive operation amount D2 indicates a correction amount from the walking model so as to fulfill the walking by adaptively stabilizing the attitude during walking correspondingly to floor surface shapes and the like. Specifically, the adaptive operation amount D2 indicates a correction amount and the like for correcting deviations from targeted trajectories of the roll axis, the pitch axis, and the yaw axis.

There is a case of computing the adaptive operation amount D2 to be output to the floor surface discrimination section 12. There is another case of computing an adaptive operation amount that is to be recomputed at the next walking timing in accordance with a walking algorithm to be selected accordingly to the floor surface category. In these cases, there are parameters and the like (to be described) for converting various sensor values into the corresponding adaptive operation amount. Conventionally, for example, inputs are supplied from the outside in advance to select walking control mode such as a specified walking algorithm or a specified parameter. The adaptive operation amount is computed in accordance with this walking control mode. As mentioned above, however, this method can allow conversion of only adaptive operation amounts from the predetermined walking control modes. Depending on floor surfaces, an appropriate adaptive operation amount may not be computed without changing the walking control mode. To solve this problem, the walking control section 13 first computes an adaptive operation amount according to various sensor values from specified walking control modes to be used as standards. The walking control section 13 then allows the floor surface discrimination section 12 to discriminate the floor surface category. The walking control section 13 receives the floor surface category D5 and selects a walking control mode from the above-mentioned standard walking control modes in accordance with this floor surface category D5.

Specifically, the walking control section 13 selects, for example, a walking algorithm corresponding to the floor surface or a parameter to compute the walking control model (walking type) or the adaptive operation amount. The walking control section 13 recomputes an adaptive operation amount in accordance with the walking control mode determined by the floor surface category, making it possible to realize more stable walking. Walking control modes may be changed in accordance with not only floor surface categories, but also the other factors such as robot body states. It just needs to prepare a most standard walking algorithm for the standard walking control mode to compute the adaptive operation amount D2 used for discriminating floor surface categories. When the robot apparatus is intended for domestic use, for example, it just needs to prepare walking control models and the like for walking on flooring floor surfaces. To continuously discriminate floor surfaces, the floor surface discrimination section 12 just needs to compute the adaptive operation amount D2 in accordance with walking control mode corresponding to the floor surface category that was input at the previous timing.

In this manner, the walking control section 13 selects an optimum walking control mode in accordance with the action instruction D1 from the action control section 11. The walking control section 13 computes the adaptive operation amount to generate a gait. The walking control section 13 outputs a command (control value) D6 to drive the actuator 350 for each joint.

For example, available floor surface types include hard floor surfaces (plate, concrete), carpet, tatami, rubber, and the like. These types of floor surfaces can be classified into floor surface categories based on elastic coefficients, friction coefficients, rolling coefficients, carpet pile lengths, or a combination of these, for example. The walking control section 13 previously learns characteristic amounts of one or more of discrimination input data, i.e., the adaptive operation amount D2, the sensor value D3, and the image data D4 used for the category discrimination. It is assumed that the floor surface discrimination section 12 stores the already learnt characteristic amounts for the respective floor surface categories as a learning database. As mentioned above, it just needs to categorize and learn not only indoor surfaces, but also outdoor surfaces such as ground and lawn where the robot apparatus can walk.

There may be an alternative to the method of previously categorizing and learning the floor surface categories based on the criteria as mentioned above. For example, the robot apparatus previously obtains one or more of discrimination input data, i.e., the adaptive operation amount D2, the sensor value D3, and the image data D4 on a plurality of types of floor surfaces. The robot apparatus itself may classify the floor surface categories using learning results. A learning result may be available when characteristic amounts are obtained from the discrimination input data and similar amounts within a specified scope are classified into one class (category). Alternatively, a learning result may be available when clustering is performed from the characteristic amounts on the assumption that the number of clusters is known. Also in this case, it is assumed that the floor surface discrimination section 12 stores the learning results for the respective floor surface categories as a learning database.

The kinetic control module 300 performs the above-mentioned processes of receiving one or more of discrimination input data, i.e., the adaptive operation amount D2, the sensor value D3, and the image data D4, determining the floor surface category, and generating an appropriate gait.

Figure 5:
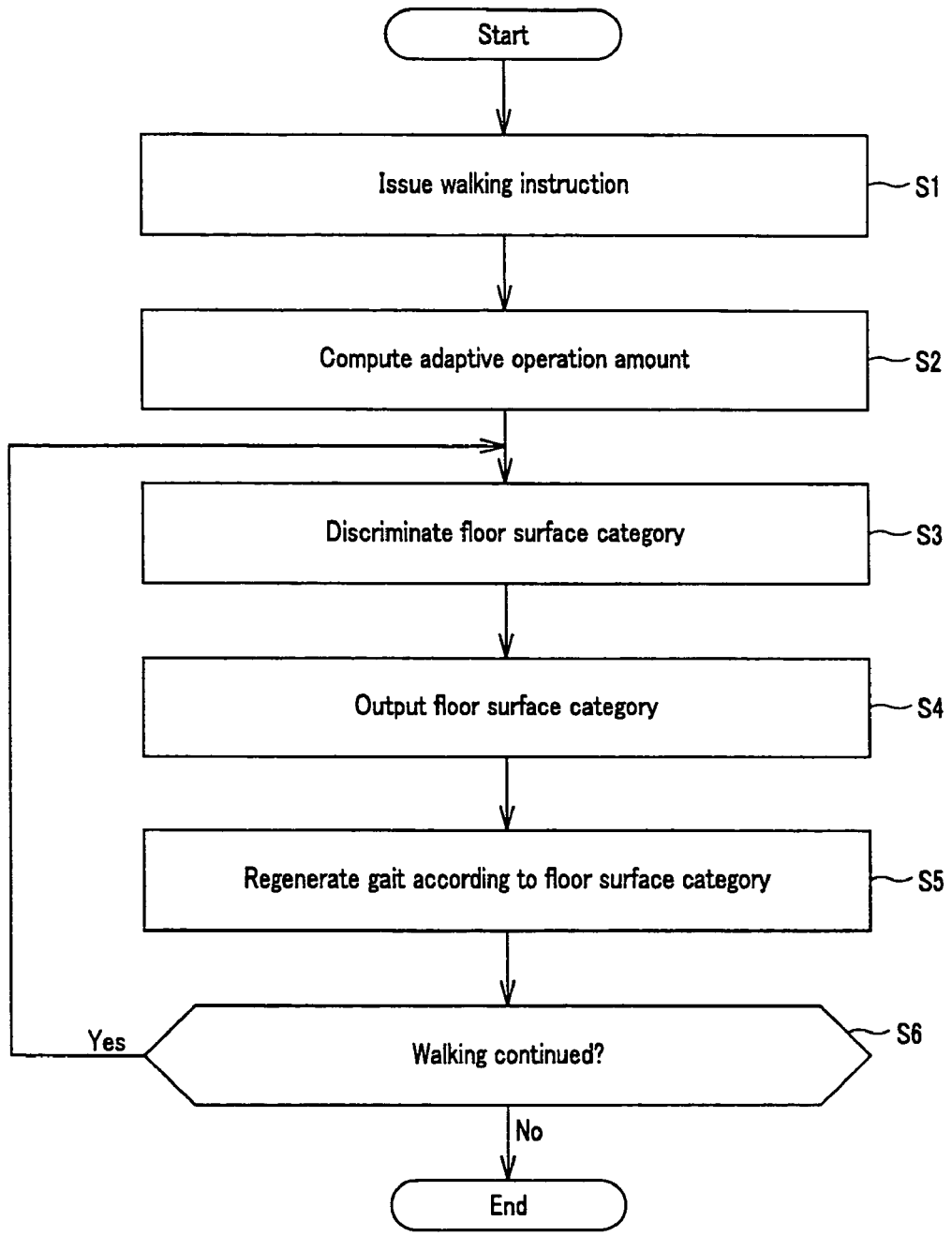
FIG. 5 is a flowchart showing a flow of floor-surface-based walking control process.

The following describes a process flow from the floor surface discrimination to the walking control. FIG. 5 is a flowchart showing a flow of floor-surface-based wailing control process. As shown in FIG. 5, the action control section 11 issues a walking instruction to the walking control section 13 (step S1). At this step, the walking control section 13 is started to perform motions to input various sensor values D3 and compute an adaptive operation amount under adaptive control (step S2). It is assumed that the adaptive operation amount D2 at this time is computed based on the standard walking control mode as mentioned above. The motions to input various sensor values D3 include an in-lace stepping motion to be described later, a normal walking motion, and the like. To perform a normal walking motion, there is not selected an optimum walking control mode corresponding to the floor surface at his time. Therefore, the walking is performed in accordance with the predetermined standard walking control mode. To continuously discriminate floor surfaces, the walking is performed in accordance with the walking control mode that is selected based on the floor surface category found by the previous floor surface discrimination.

During the normal walking or in-place stepping motion, the floor surface discrimination section 12 is supplied with the adaptive operation amount D2 from the walking control section 13, the sensor values D3 from various sensors such as the foot sensor 360, and the image data D4 from the image input apparatus 251 such as a camera. The floor surface discrimination section 12 uses characteristic amounts for these inputs to perform pattern recognition of the floor surface category (step S3). The floor surface discrimination section 12 discriminates to which of the floor surface categories the current floor surface belongs. The floor surface discrimination section 12 outputs the floor surface category as a floor surface discrimination result to the walking control section 13 (step S4). The walking control section 13 selects an optimum walking control mode in accordance with the supplied floor surface category and performs walking control (step S5). Specifically, for example, the walking control section 13 reselects a parameter to compute the adaptive operation amount and recomputes the adaptive operation amount as a walking control amount. If the walking is repeated (Yes at step S6), the process from step S3, i.e., the floor surface category discrimination is repeated. The floor surface category discrimination may be always performed during walking or may be scheduled at a specified timing.

The following describes an example method of computing the adaptive operation amount D2 used for the floor surface category discrimination. The above-mentioned step S2 needs input of various sensor values concerning the current floor surface state to compute the adaptive operation amount D2. This value may be obtained while walking. Further, it is possible to prepare a motion to discriminate the floor surface category and use this motion for floor surface discrimination. Such motions for floor surface discrimination include an in-place stepping motion. The following describes a method of discriminating the current floor surface by performing an in-place stepping motion.

Figure 6A:
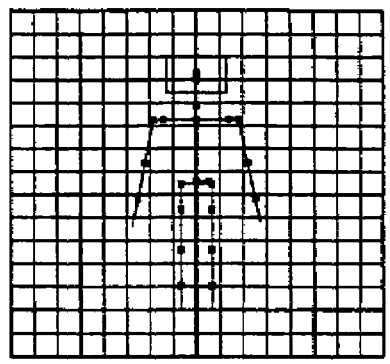
FIGS. 6A through 6D show that the robot apparatus is stepping in place.
Figure 6B:
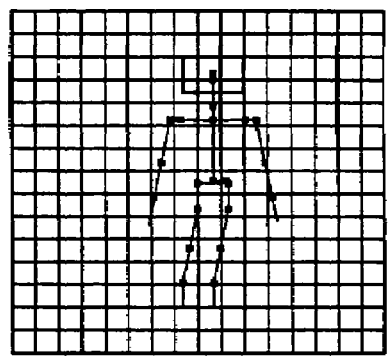
Figure 6C:
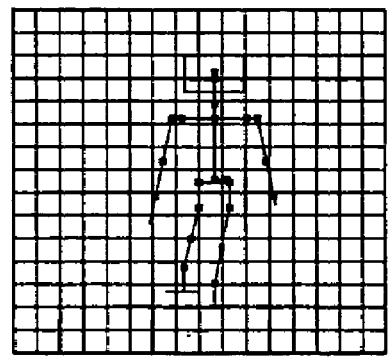
Figure 6D:
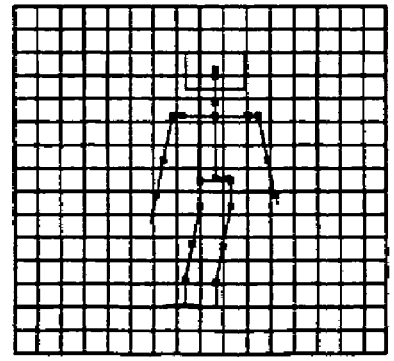
Figure 7A:
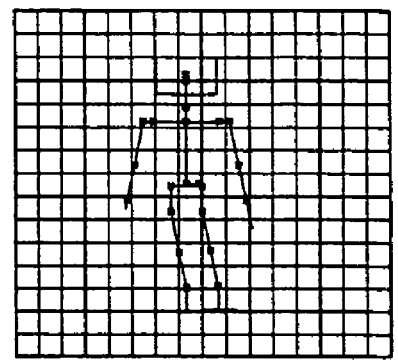
FIGS. 7A through 7D likewise show that a robot apparatus 1 is stepping in place after the operation in FIG. 6D.
Figure 7B:
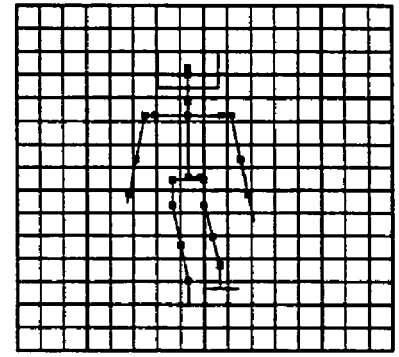
Figure 7C:
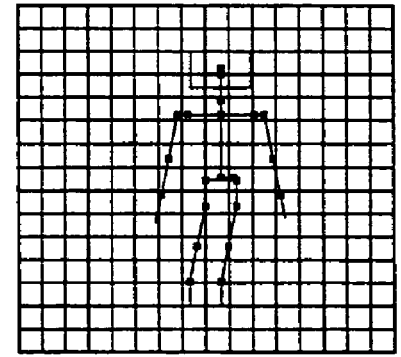
Figure 7D:
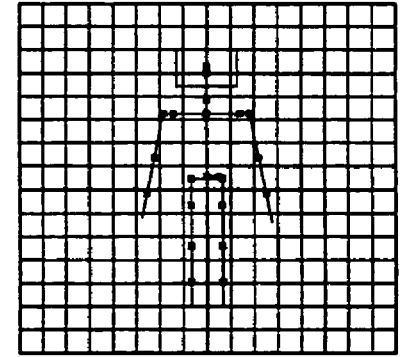

FIGS. 6A through 6D and FIGS. 7A through 7D show that the robot apparatus 1 is stepping in place. From an upright state (FIG. 6A), the robot apparatus 1 balances the body (FIG. 6B), once raises the right leg (FIG. 6C), and then lowers it to the ground (FIG. 6D). Likewise, the robot apparatus 1 balances the body (FIG. 7A), once raises the left leg (FIG. 7B), lowers it to the ground (FIG. 7C), and returns to the upright state (FIG. 7D).

A sequence of in-place stepping motion makes it possible to obtain sensor values corresponding to the floor surface. Based on the sensor value D3, the walking control section 13 computes the adaptive operation amount D2. The floor surface discrimination section 12 then uses the sensor value D3 and the adaptive operation amount D4 to discriminate the category of the current floor surface. The in-place stepping motion represented here can be configured to have a walking cycle of 600 msec, a foot raising height of 20 mm, and a both-leg supporting ratio of 30%, i.e., a ratio of time for landing both feet during a sequence of in-place stepping motion. These values are used as parameters for the in-place stepping motion.

The following description assumes that the in-lace stepping motion and the like are used to acquire sensor values and the adaptive operation amount and discriminate floor surface categories. As mentioned above, it may be preferable to discriminate floor surface categories while walking. Further, the floor surface category discrimination may use the image data D4 in combination with or independently of sensor values and the adaptive operation amount.

The following describes in detail how the floor surface discrimination section 12 discriminates floor surface categories. The floor surface discrimination section 12 may use any pattern recognition technique that can discriminate floor surface categories in accordance with one or more of discrimination input data, i.e., the adaptive operation amount D2, various sensor values D3, and the image data D4. The following describes an example of discriminating categories based on the Fisher criteria using an example of input data as listed in Table 1 below. The data here is input when the floor surface discrimination section 12 discriminates floor surface categories.

TABLE 1

| Sensor values | Adaptive operation amount | Image data |
|---|---|---|
| Each joint angle Foot sole's acceleration in forward direction Foot sole's acceleration in sidewise direction Foot sole's force (vertical direction) | Roll axis operation amount Pitch axis operation amount | Floor surface image |

In Table 1, the roll axis operation amount and the pitch axis operation amount indicate a difference between the scheduled trajectory (targeted trajectory) and the actual trajectory. The difference can be used as a correction amount to be corrected by an adaptive operation. Obviously, all or some selected values may be used to perform the floor surface category discrimination.

Figure 8:
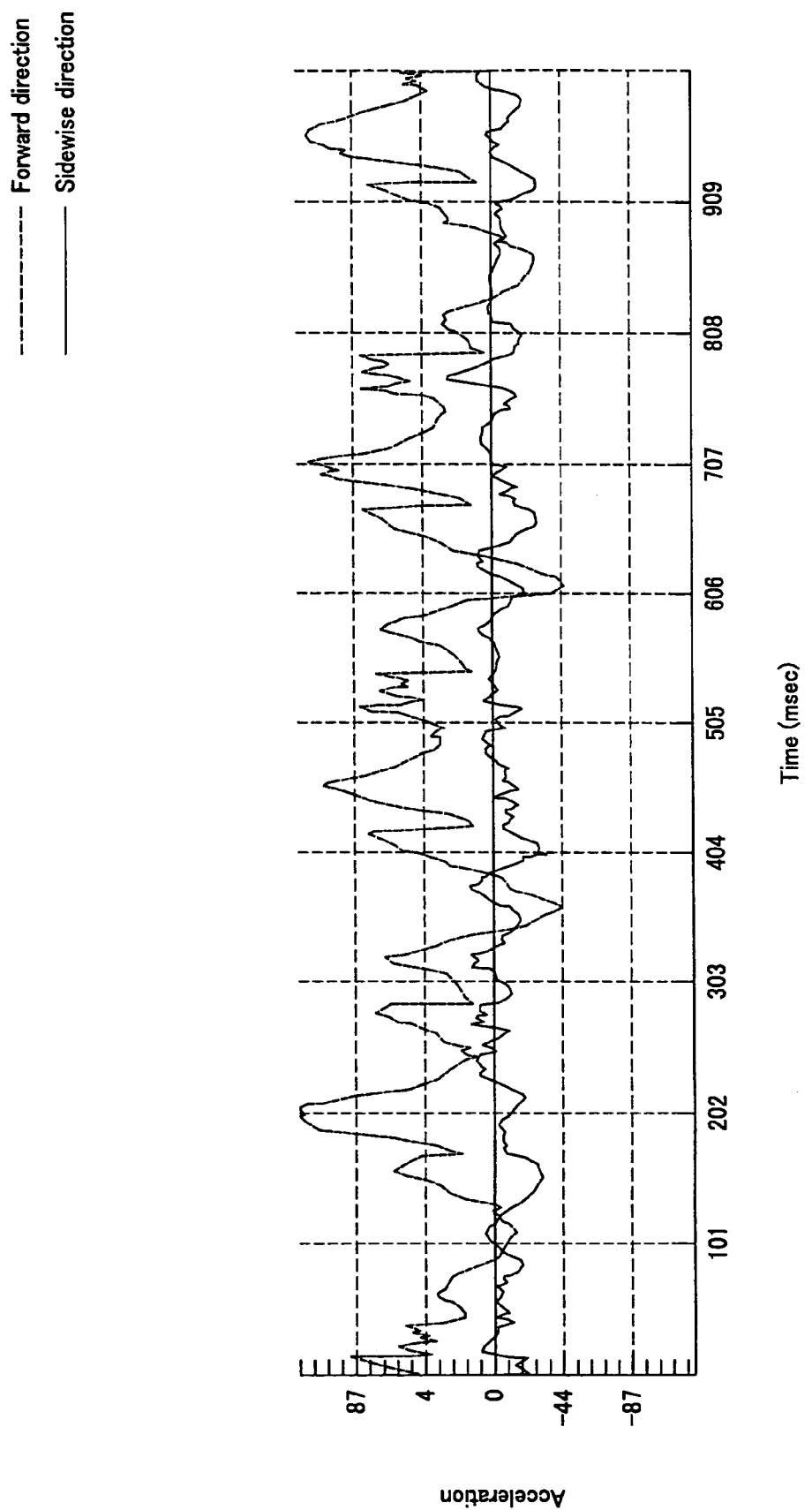
FIG. 8 is a graph showing chronological values of foot sole acceleration in forward and sidewise directions by assigning the time to the abscissa and the acceleration to the ordinate.

These values are output at a control loop cycle for kinetic control, e.g., every 4 msec. For example, the foot sole acceleration is input as chronological data as shown in FIG. 8. FIG. 8 is a graph showing chronological values of foot sole acceleration in forward and sidewise directions by assigning the time to the abscissa and the acceleration to the ordinate. In FIG. 8, the broken line indicates data about a foot sole acceleration in the forward direction (traveling direction). The solid line indicates data about a foot sole acceleration in the sidewise direction.

As shown in FIG. 8, the input foot sole acceleration is stored chronologically. A characteristic amount is extracted from the input data obtained in this manner. For example, the fast Fourier transform (FFT) is performed using a specified window size for chronological values of the foot sole acceleration. Data on the time axis is converted into data on the frequency axis for conversion into the characteristic amount.

Figure 9:
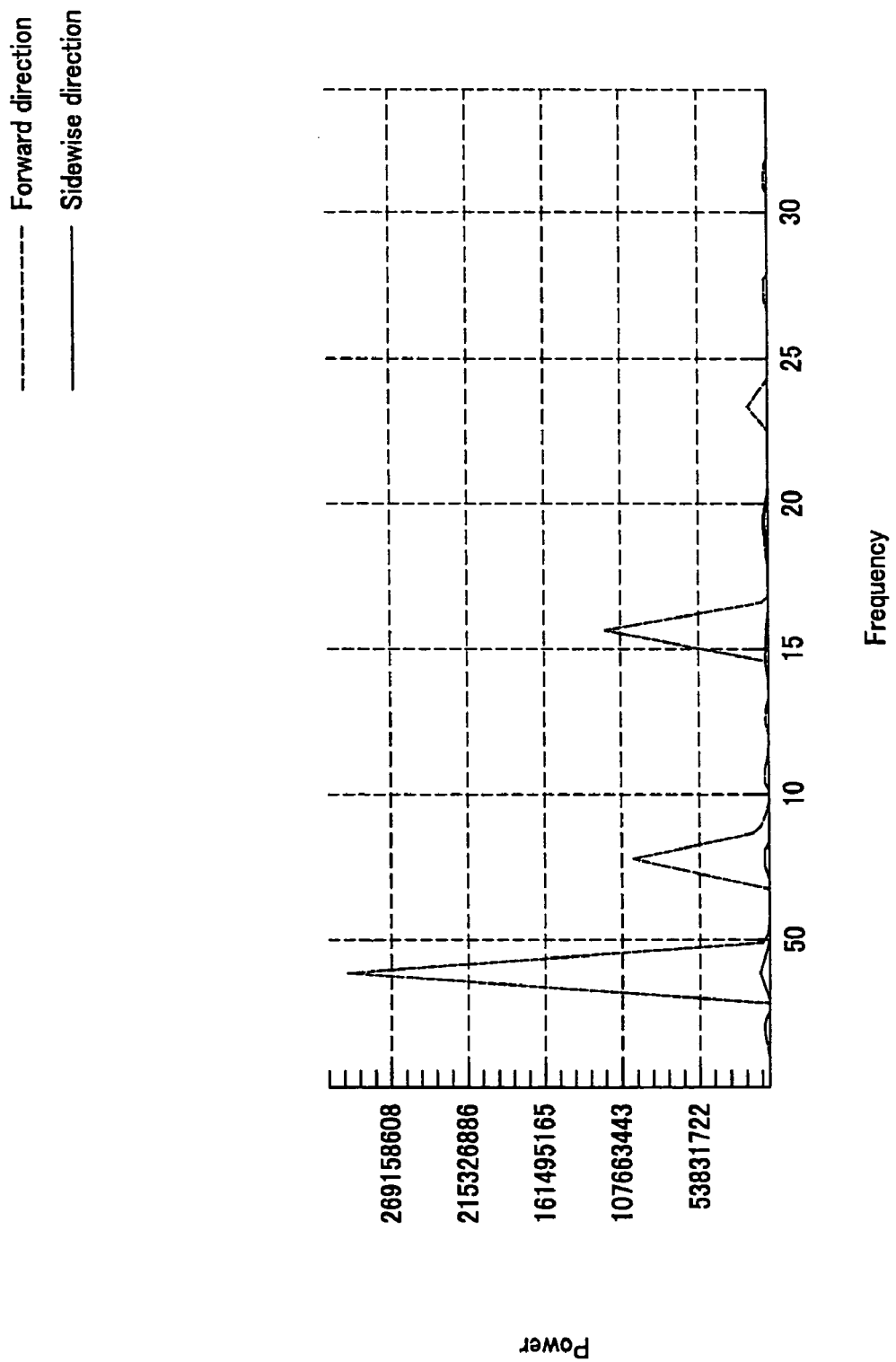
FIG. 9 is a graph showing a Fourier power spectrum by Fourier transforming chronological values of foot sole acceleration in forward and sidewise directions as shown in FIG. 8 by assigning frequencies to the abscissa and power to the ordinate.

FIG. 9 is a graph showing a Fourier power spectrum by Fourier transforming chronological values of foot sole acceleration in forward and sidewise directions as shown in FIG. 8 by assigning frequencies to the abscissa and power to the ordinate. Also in FIG. 9, the broken line indicates a foot sole acceleration in the forward direction (traveling direction), and the solid line indicates data about a foot sole acceleration in the sidewise direction. Out of the above-mentioned input data, FIGS. 8 and 9 show only the foot sole accelerations in forward and sidewise directions for simplicity. It is also possible to likewise chronologically store the other input data used for the floor surface category discrimination and to Fourier transform the chronological values into a characteristic amount to be used.

Let us assume that the Fourier power spectrum has dimension information for one value. When four input values are used, for example, they can be assumed to be a 4d-dimensional feature vector. The example in FIG. 8 represents d=35 dimensions. Since there are too many dimensions in this state, the dimensions are compressed by means of the principal component analysis. Further, the linear discriminant analysis is performed based on the Fisher criteria. The linear discriminant analysis presents a problem of multi-class discrimination using classes as many as the floor surface categories.

The following describes a method of classifying floor surface categories. As mentioned above, floor surface categories may be classified by learning the characteristic amount of discrimination input data for each of floor surface categories classified in accordance with a specified criterion. Alternatively, floor surface categories may be classified by learning large characteristic amounts of discrimination input data and using the similarity and the like of the characteristic amounts. That is to say, floor surface categories may be classified in accordance with the necessary categories prepared in advance or may be classified as needed during actual walking. Furthermore, categories may be added as needed for additional learning.

The following describes a case where the human side classifies floor surface categories using the following criteria (features) for the floor surface category classification.
1. Elastic coefficient (Young's modulus)
2. Friction coefficient
3. Rolling coefficient
4. Carpet or rug pile length
5. Combination of items 1 through 4

When different floor surface categories are prepared for floor surfaces having one or more different features, it is possible to prepare walking control modes corresponding to the floor surface categories. According to the floor surface categories, the feature to influence the walking depends on the structure of the robot apparatus to be used and the floor surface where the robot apparatus actually walks. It is necessary to select criteria for category classification according to degrees of the influence.

The floor surface categories can be discriminated as follows. The floor surface category discrimination uses the discrimination input data such as various sensor values, the adaptive operation amount, and the image data. The characteristic amount of these discrimination input data is previously learnt for each classified floor surface (floor surface category). The floor surface discrimination section 12 stores the characteristic amount as the learning database. The stored characteristic amount is compared with the characteristic amount for discrimination input data that is obtained from the current floor surface during the above-mentioned in-place stepping motion or the walking.

The embodiment assumes the robot apparatus as a domestic consumer product and describes floor surface categories that are considered to be necessary in home environments. The above-mentioned "4. Carpet or rug pile length" can be used as a classification criterion so as to classify the floor surface categories in home environments.

Specifically, ordinary floor surfaces in home environments are classified as "plate material (flooring)" and "carpet" according to the above-mentioned classification criterion. The following three categories need to be classified.

Floor surface 1: thick-piled carpet (pile length of longer than or equal to 6 mm)

Floor surface 2: thin-piled carpet (pile length of shorter than 6 mm)

Floor surface 3: flooring (equivalent to pile length of 0 mm)

The pile length is used as the classification criterion for the following reason. The inventors carried out experiments by allowing the robot apparatus to actually walk and found that the pile length most influences the walking performance. That is to say, we found that the walking control section 13 needs to prepare different walking control modes (parameters or walking algorithms) for each of the three floor surface categories.

The following describes information (discrimination input data) used for the three floor surface categories to classify actual floor surfaces. The floor surface category discrimination is performed by using discrimination input data resulting from one or more combinations of the above-mentioned input data supplied to the floor surface discrimination section 12. The discrimination input data is obtained by processing (pre-processing) the above-mentioned chronological values by means of some technique and is applied to the floor surface categories in the subsequent linear discrimination.

The preprocessing can use the following methods. When one-dimensional information is provided, the above-mentioned sensor values and adaptive operation amount are obtained during the above-mentioned in-place stepping motion or during the walking. The sensor values and the adaptive operation amount obtained during such motions somehow contain information about the floor surface. Fourier power spectrum characteristics and auto-correlation characteristics are available as the information about floor surfaces, i.e., floor surface's characteristic amounts.

When two-dimensional information is provided, it is an input image supplied from the image input means 251 such as a camera, for example. Different processes are used because the information is two-dimensional and an area needs to be divided. Basically, it is possible to use the same characteristic amount as for the one dimensional information as mentioned above. There are methods of obtaining Fourier power spectrum characteristics as the characteristic amount of input image. An example is to separate or extract a floor surface area from the input image. There are methods of extracting a floor surface area from the input image. An example of extracting a floor surface area is to extract a dominative plane in accordance with the Hough transform from a stereo parallax between both eyes, convert the plane into coordinates, and determine whether or not the plane is a floor surface.

The process then finds a two-dimensional Fourier power spectrum of the extracted floor surface area. A scanning method is used to expand the two-dimensional Fourier power spectrum into one-dimensional vector. In this manner, two-dimensional information such as input images can be processed like the characteristic amount of the floor surface as the one-dimensional information.

Figure 10:
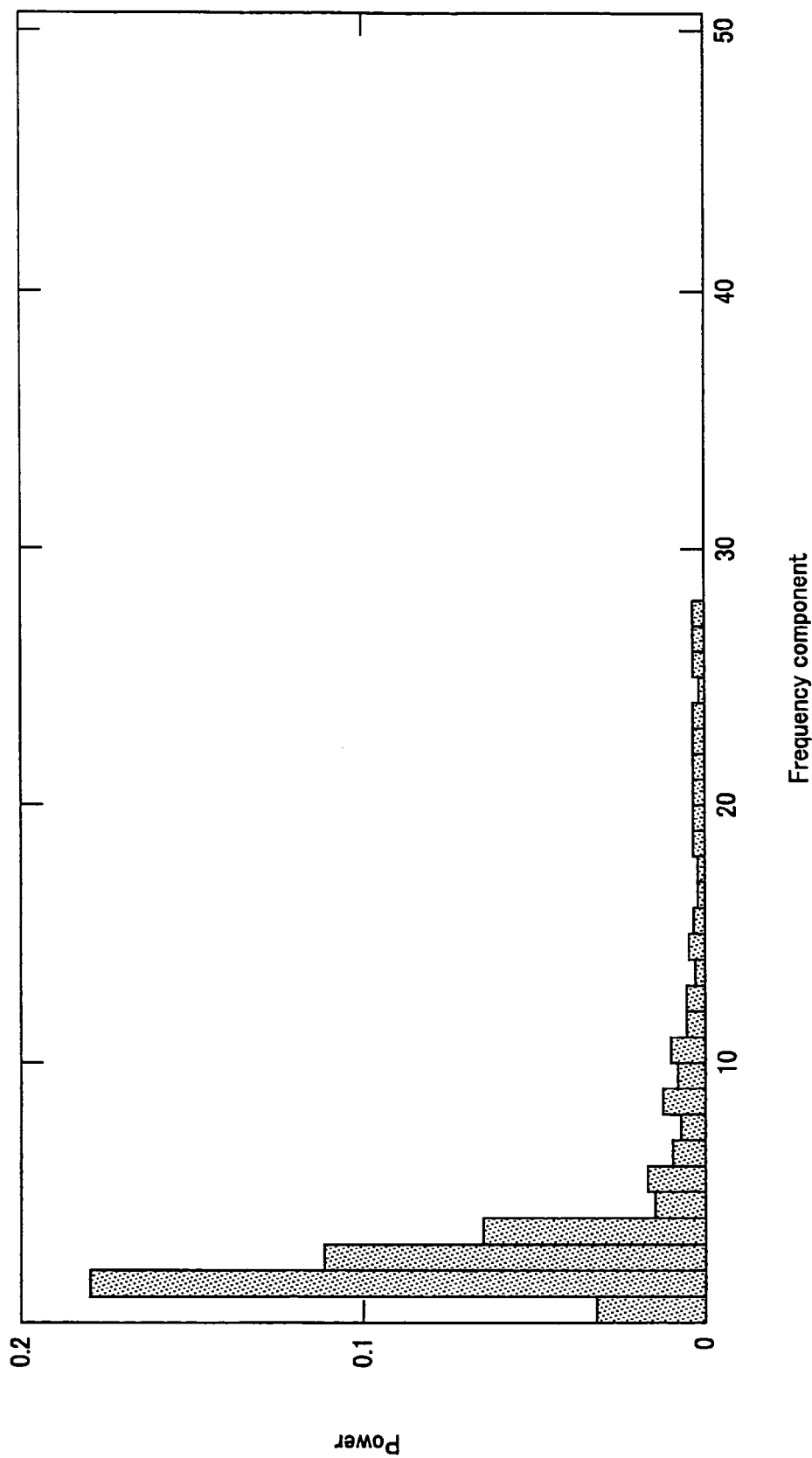
FIG. 10 is a graph showing Fourier power spectrum characteristics obtained by Fourier transforming a chronological value at a given point of the roll axis operation amount.
Figure 11:
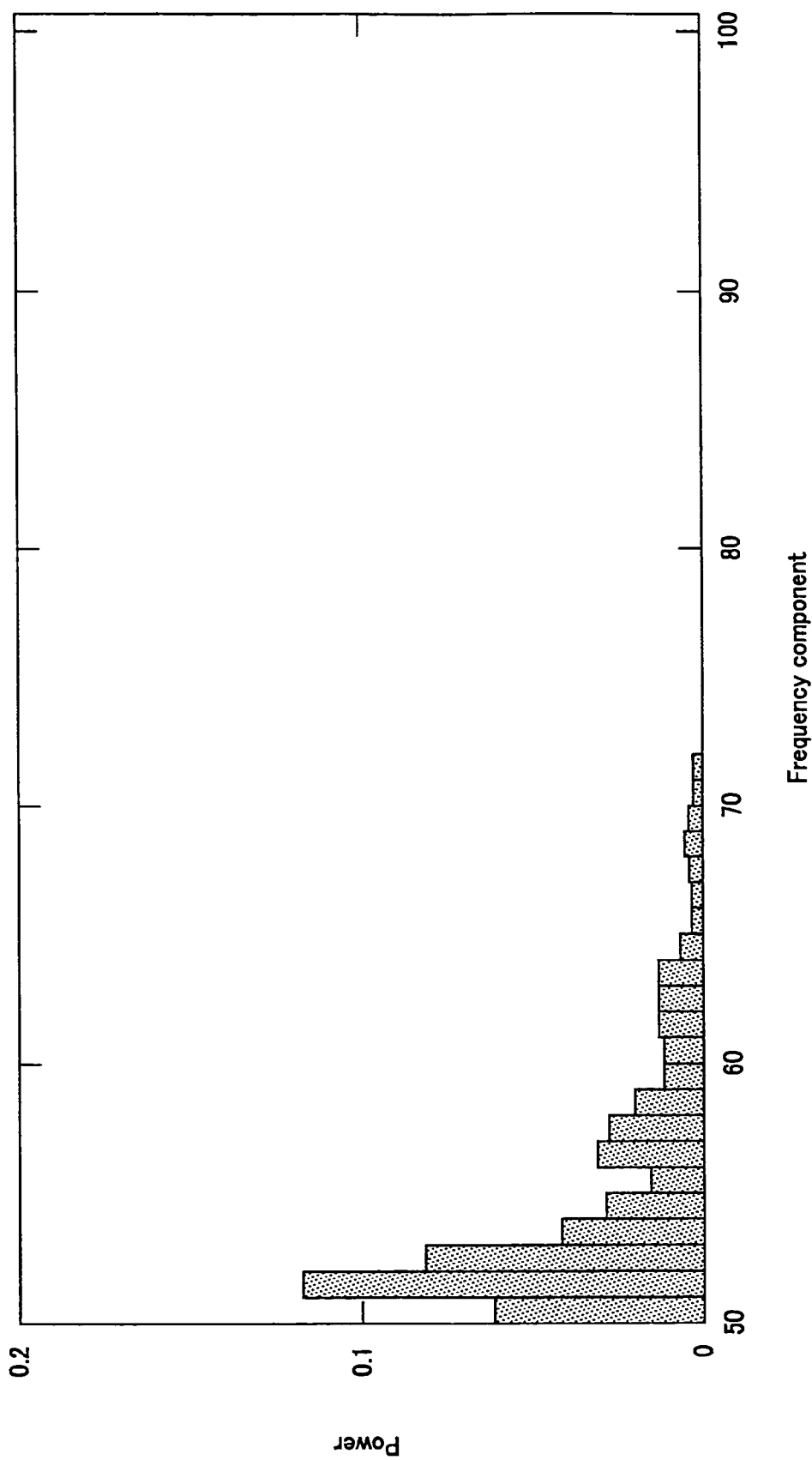
FIG. 11 is a graph showing Fourier power spectrum characteristics obtained by Fourier transforming a chronological value at a given point of the pitch axis operation amount.
Figure 12:
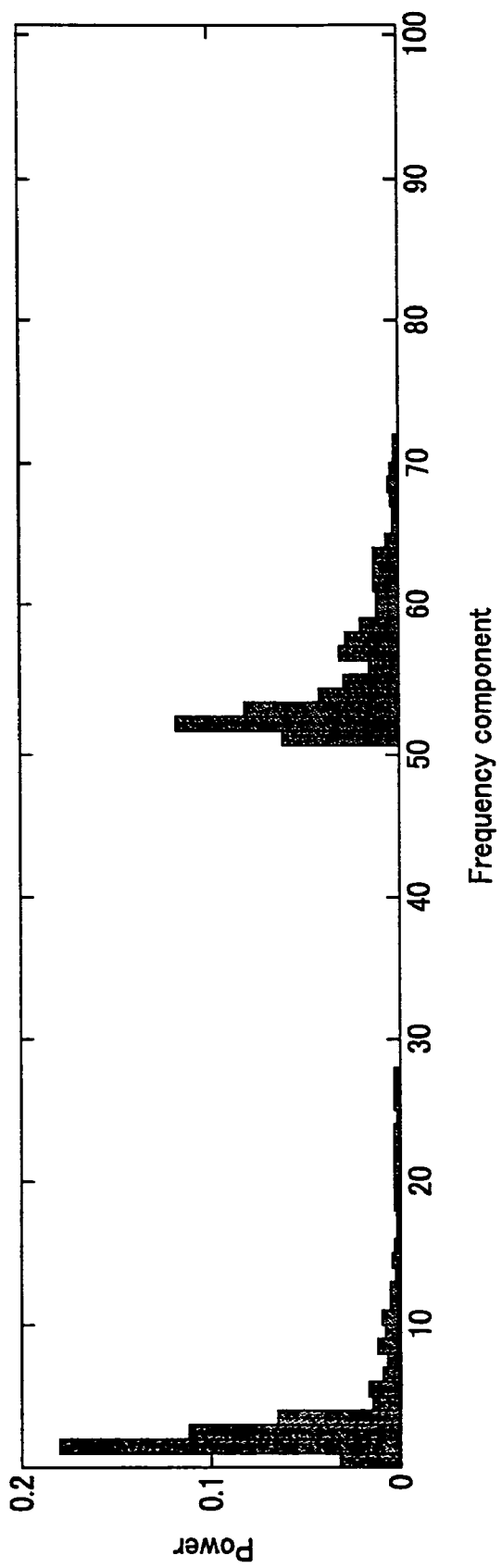
FIG. 12 shows an example of treating two pieces of data as one block of data.

The following describes an example method of determining the floor surface categories by converting discrimination input data, i.e., two input data such as a roll axis operation amount and a pitch axis operation amount, into the characteristic amount. FIGS. 10 and 11 are graphs showing Fourier power spectra obtained by Fourier transforming chronological values at a given point of the roll axis operation amount and the pitch axis operation amount. In FIGS. 10 and 11, the abscissa corresponds to frequencies and the ordinate corresponds to the power. These two data are processed as one block of data as shown in FIG. 12. That is to say, two data can be successively processed as one data as follows. Data for the roll axis operation amount is converted so as to assign, e.g., values 0 through 50 to the Fourier power spectrum's abscissa (frequency components). Data for the pitch axis operation amount is converted so as to assign, e.g., values 50 through 100 to the Fourier power spectrum's abscissa (frequency components). Such operation can be used to compound a plurality of characteristic amounts for use.

In this manner, the Fourier power spectrum is obtained by compounding characteristic amounts of the roll axis operation amount and the pitch axis operation amount. The Fourier power spectrum is used as input to the linear discriminant analysis to determine the floor surface categories. For example, a robot apparatus having the walking cycle of 8 msec can generate the compound Fourier power spectrum up to 125 times in a second. Of course, the linear discriminant analysis may be performed not only at the walking cycle, but also at a specified timing.

The data in FIG. 10 can be represented as a vector in equation (1) as shown below.

$$x = \begin{pmatrix} 0.0308 \\ 0.1793 \\ \vdots \\ 0.00007 \end{pmatrix} \quad \text{Equation (1)}$$

As mentioned above, the robot apparatus needs to previously learn the characteristic amount as input to the linear discriminant analysis for each of the floor surface categories. For example, the floor surface categories can be learnt by performing the above-mentioned in-lace stepping motion on a floor surface belonging to each floor surface category and collecting a large amount of vector x as shown in equation (1) mentioned above. For example, an in-place stepping motion for 10 seconds can collect 1250 vectors x. The description here is assumed to use three floor surface categories, i.e., "flooring", "thin-piled carpet (pile length of shorter than 6 mm)", and "thick-piled carpet (pile length of longer than or equal to 6 mm)". The floor surface categories are learnt, for example, by performing the in-place stepping motion for 10 seconds on the three floor surfaces to collect 1250 vectors x for each floor surface.

When the learning is performed, there may be no difference between characteristic amounts for each of the classified floor surface categories. This indicates that the floor surface category discrimination is difficult. In such case, two possibilities are conceivable: one is that the robot apparatus attempts to determine the floor surface categories of which classification is essentially impossible (e.g,. smooth stone floor and flat grass floor cannot probably be classified, because both surfaces are hard and smooth, thereby the robot apparatus scarcely find a difference between them.); the other is that, there is not enough freedom degree for the characteristic amount used for discrimination and the discrimination to be solved by the learning algorithm, or there is low freedom degree (information amount may not be enough if only one value of potentiometer is used). In either case, if performing learning in advance can classify floor surface categories for each characteristic amount of the discrimination input data, the categories can be actually discriminated through the use of the characteristic amount.

The embodiment performs the linear discriminant analysis based on the Fisher criteria for the purpose of the floor surface category discrimination. This technique projects characteristic amounts onto a discrimination space that minimizes dispersion in each category and maximizes dispersion between categories. The technique uses distances in that space for the category discrimination.

Figure 13:
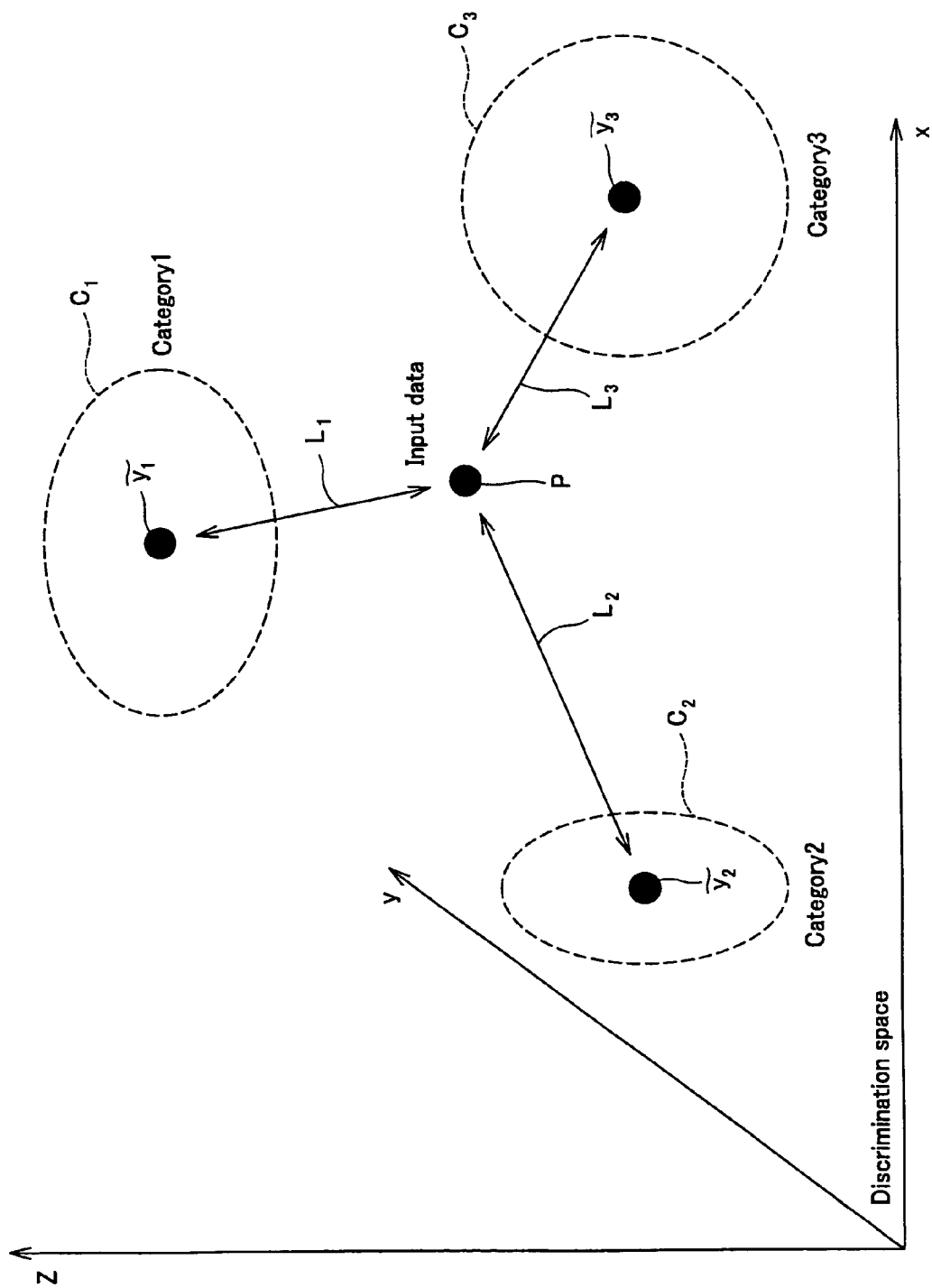
FIG. 13 shows a discrimination space to discriminate floor surface categories by projecting characteristic amounts.

It is assumed that the floor surface category is represented as a floor surface class and that the kth class out of K classes is represented as class $C_k$. The linear discriminant analysis is performed by converting input vector x into vector y in the discrimination space as shown in FIG. 13 using a conversion equation (2) below and measuring a distance between respective points (vectors) in that space.

$$y = A^t x \quad \text{Equation (2)}$$

When a distance between value y in the discrimination space for input vector x and the class center in the discrimination space for an average value (class center) of data for class $C_k$ is shorter than a distance between value y and another class center, the input vector x is assumed to belong to class $C_k$. That is to say, a short distance indicates similarity between data values. In the description to follow, the specification uses $<x_k>$ to represent an average value (class center) of data for class $C_k$ and $<y_k>$ to represent the class center in the discrimination space.

The following shows how to find coefficient matrix A in the conversion equation (2) mentioned above. That is to say, let us assume a class average to be $<x_k>$ and an overall average to be $<x_T>$. Let us define in-class covariance $\Sigma_w$ and inter-class covariance $\Sigma_B$ as respectively expressed in equations (3) and (4) described below. In this condition, the coefficient matrix A can be found as a solution to the characteristic value problem as shown in equation (5) to follow.

$$\sum_W = \sum_{k=1}^{K} \sum_{i \subset C_k} (x_i - \tilde{x}_k)(x_i - \tilde{x}_k)^t \quad \text{Equation (3)}$$

$\tilde{x}_k$: Average value (class center) of data for class $C_k = <x_k>$
$\tilde{x}_T$: Average value of all data $= <x_T>$ $$\sum_B = \sum_{k=1}^{K} (\tilde{x}_k - \tilde{x}_T)(\tilde{x}_k - \tilde{x}_T)^t \quad \text{Equation (4)}$$

$$\sum_B A = \sum_W A \Lambda, \; A^t \sum_W A = I \quad \text{Equation (5)}$$

The coefficient matrix A is created in advance by using many vectors x as mentioned above. Actually, the robot apparatus determines a floor surface by discriminating the category for input data P using the prepared coefficient matrix A and precomputed class center $<y_k>$. That is to say, the input data P can be classified into a class that provides shortest distance $L_n$ between the input data P and the class center $<y_k>$.

In this manner, the floor surface category is obtained as a result of the floor surface category discrimination and is supplied to the walking control section 13. In accordance with the supplied floor surface categories, the walking control section 13 can change algorithms for computing trajectories such as the roll axis and the pitch axis and modify parameters (coefficients) used for the trajectory computation. Modifiable parameters include, for example, a pace, walking cycle (time per step), both-leg supporting ratio, PID gain, and the like. Table 2 below shows an example of modifying parameters.

TABLE 2

| | Pace | Walking cycle | Both-leg supporting ratio |
|---|---|---|---|
| Flooring | 70 mm | 600 msec | 25% |
| Carpet with pile length of shorter than 6 mm | 60 mm | 800 msec | 30% |
| Carpet with pile length of longer than or equal to 6 mm | 50 mm | 1000 msec | 50% |

As mentioned above, it becomes possible to select walking control modes such as parameters for converting an optimum walking control (adaptive operation amount) from various sensor values in accordance with the floor surface category. An optimum walking algorithm can be used in accordance with floor surface conditions. Consequently, stable walking becomes available even if floor surface conditions vary greatly. Recognition of the floor surface category selects the walking control mode most suitable for stable walking. It becomes possible to provide other capabilities such as walking faster than normal and the like.

Further, when the robot apparatus recognizes a floor surface not suited for walking, it is possible to provide control that stops walking by notifying the condition of "not capable of walking". This prevents the robot apparatus from tumbling after continuing awkward walking.

Moreover, the floor surface category information can be associated with an environmental map to improve the environmental map's performance. When the robot apparatus moves from a flooring room to a carpet room, for example, storing the floor surface category information can automatically change the walking control mode such as the walking algorithm to adaptively generate a gait without the need for the above-mentioned in-place stepping motion.

Furthermore, the use of the knowledge about floor surfaces makes it possible to identify preferable or unpreferable floors, frequented or unfrequented floors, and the like. The knowledge can be provided as interactive contents with users.

The following describes the embodiment of the present invention to perform the floor surface category discrimination using actual data. The description here uses only one discrimination input data for simplicity. As mentioned above, however, it is to be distinctly understood that a plurality of data may be unified for the floor surface discrimination. When the discrimination input data is properly selected, single discrimination input data can be used to discriminate floor surface categories.

Figure 14A:
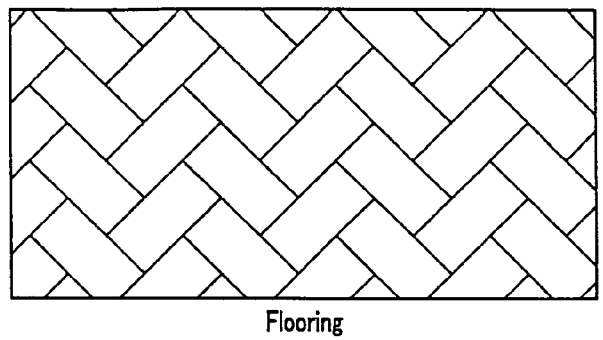
FIG. 14A schematically shows a flooring surface.
Figure 14B:
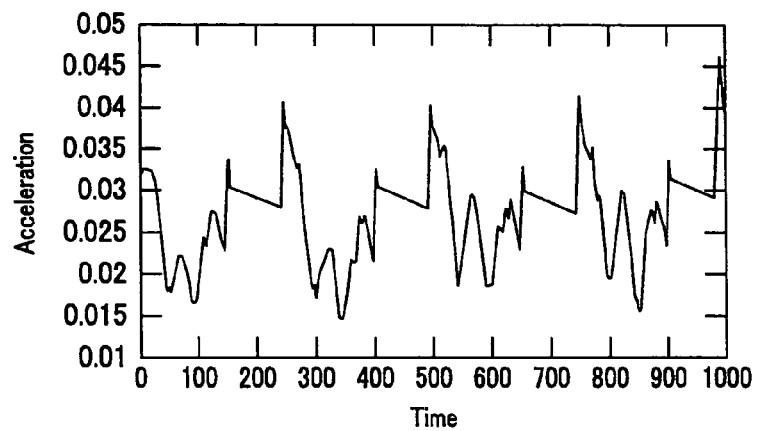
FIG. 14B shows chronological values obtained by in-place stepping on the flooring surface.
Figure 14C:
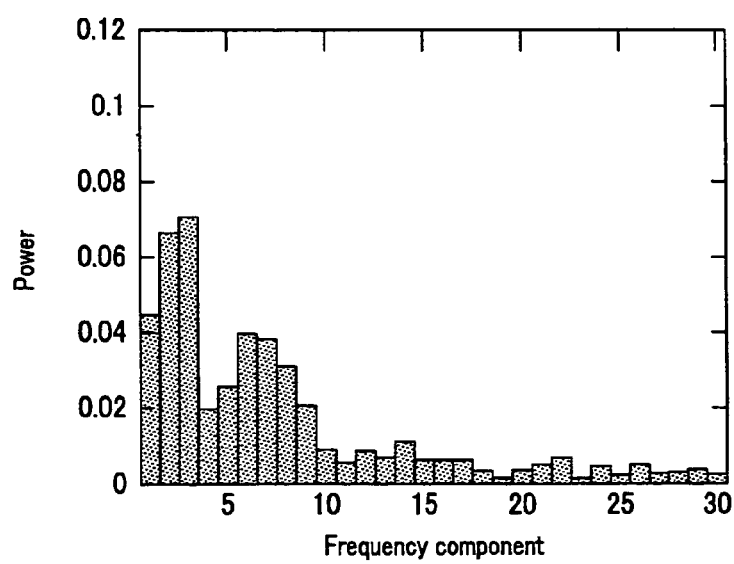
FIG. 14C is a graph showing characteristic amounts on the flooring surface resulting from Fourier transforming the obtained chronological values.
Figure 15A:
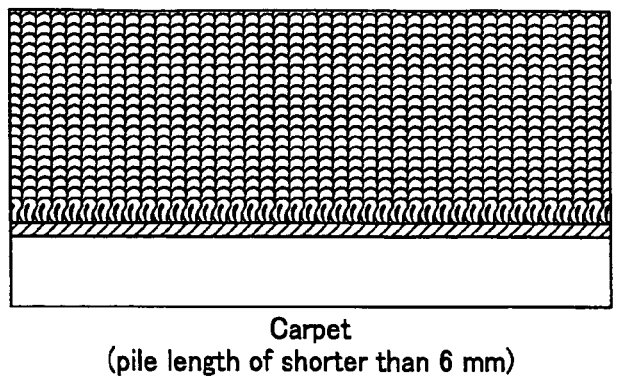
FIG. 15A schematically shows a carpet floor surface having a pile length shorter than 6 mm.
Figure 15B:
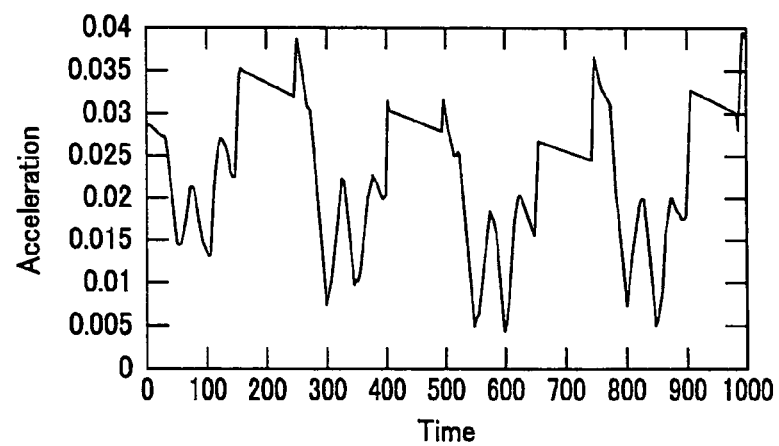
FIG. 15B shows chronological values obtained by in-place stepping on the carpet floor surface having a pile length shorter than 6 mm.
Figure 15C:
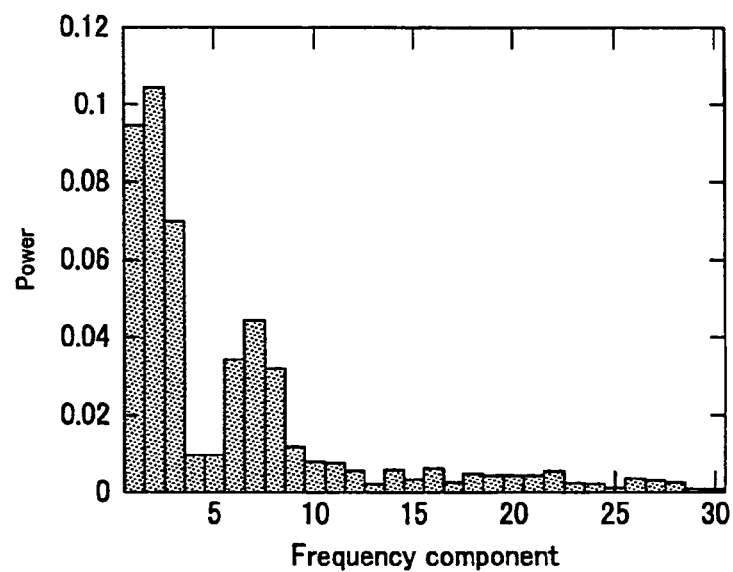
FIG. 15C is a graph showing characteristic amounts on the carpet floor surface having a pile length shorter than 6 mm resulting from Fourier transforming the obtained chronological values.
Figure 16A:
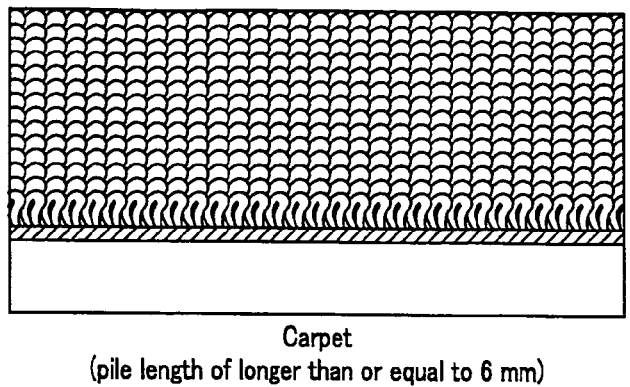
FIG. 16A schematically shows a carpet floor surface having a pile length longer than or equal to 6 mm.
Figure 16B:
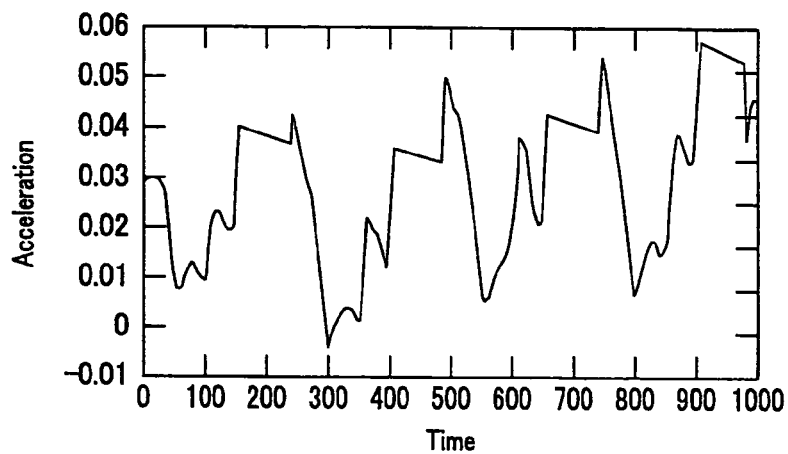
FIG. 16B shows chronological values obtained by in-place stepping on the carpet floor surface having a pile length longer than or equal to 6 mm.
Figure 16C:
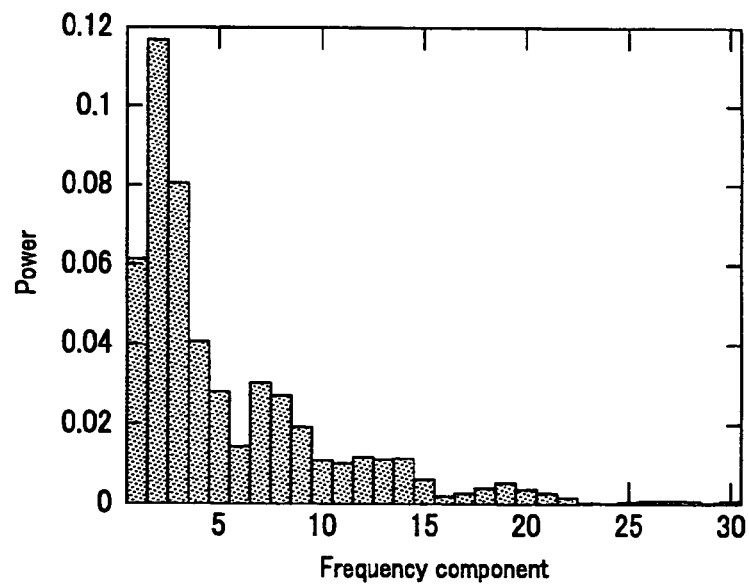
FIG. 16C is a graph showing characteristic amounts on the carpet floor surface having a pile length longer than or equal to 6 mm resulting from Fourier transforming the obtained chronological values.
Figure 17:
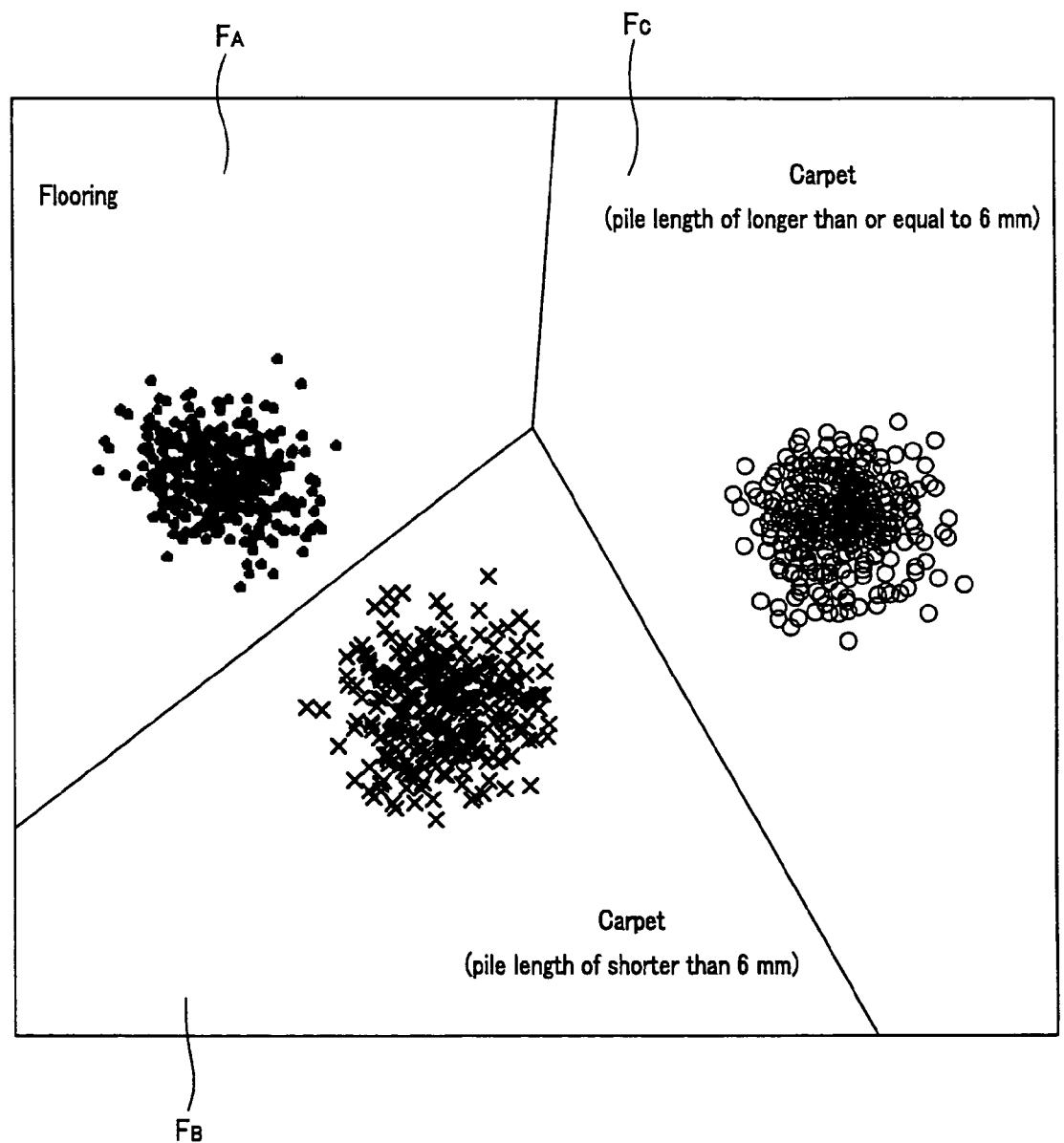
FIG. 17 illustrates boundaries for discriminating three classes in a two-dimensional space.
Figure 18:
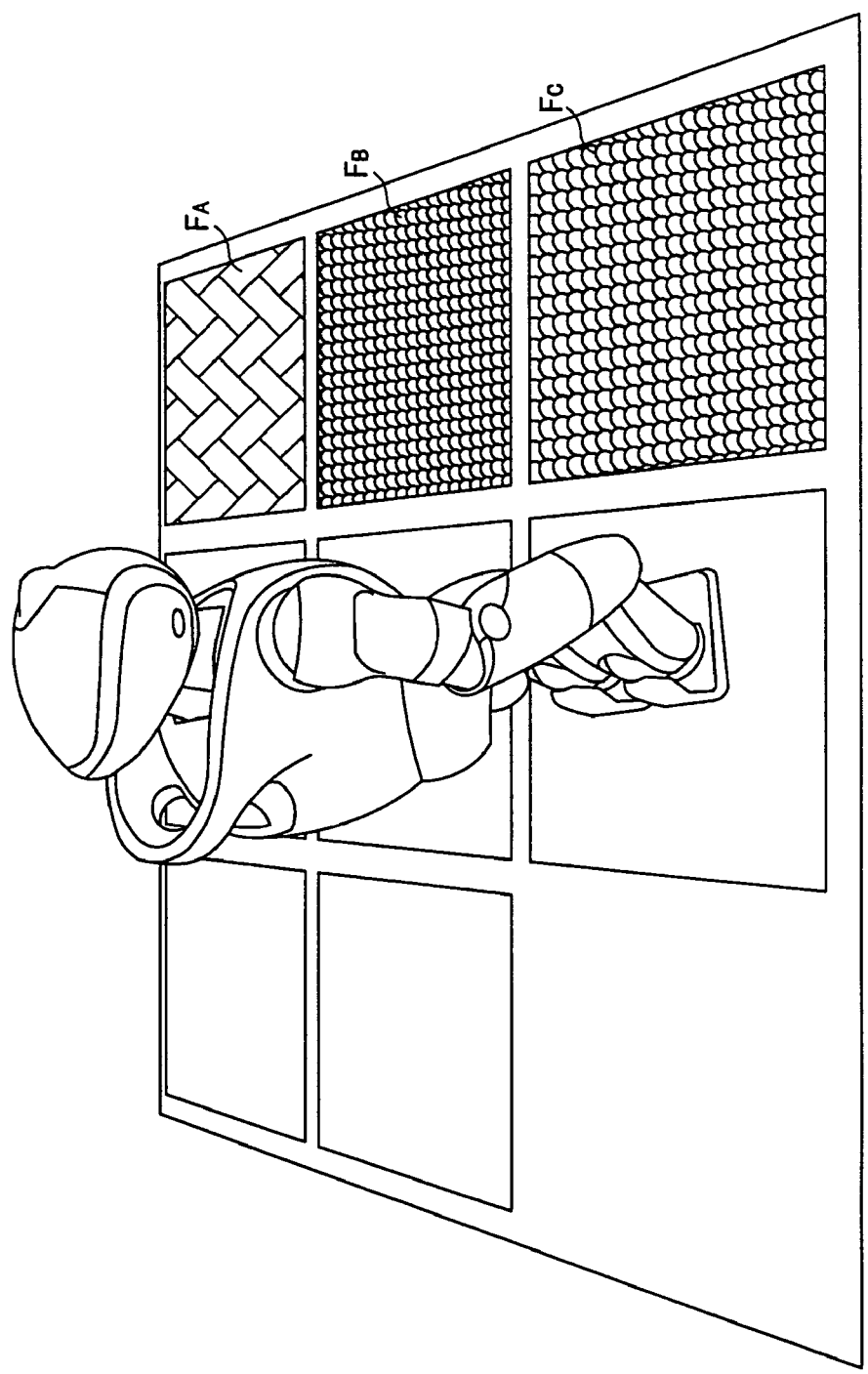
FIG. 18 shows how the robot apparatus steps in place to discriminate floor surfaces.

As data to be used for the floor surface discrimination, the embodiment uses chronological values for the roll axis operation amount during the above-mentioned in-lace stepping motion. FIGS. 14A, 15A, and 16A schematically show floor surfaces composed of flooring $F_A$, carpet $F_B$ having a pile length shorter than 6 mm, and carpet $F_C$ having a pile length longer than or equal to 6 mm, respectively. FIGS. 14B, 15B, and 16B are graphs showing chronological values obtained by stepping in place on the respective floor surfaces. FIGS. 14C, 15C, and 16C are graphs showing the floor surfaces' characteristic amounts obtained by Fourier transforming the chronological values. FIG. 17 illustrates boundaries for discriminating three classes. FIG. 18 shows how the robot apparatus steps in place to discriminate the floor surfaces.

To discriminate the floor surface categories, the robot apparatus previously learns characteristic amounts for roll axis operation amounts in the respective floor surface categories. During the learning, there are provided floor surfaces to be classified into the floor surface categories as shown in FIG.

18. The robot apparatus is allowed to step in place to obtain many characteristic amounts. As shown in FIGS. 14 through 16, characteristic amounts for the floor surfaces are obtained from chronological data of the roll axis operation amounts for the floor surfaces. The linear discriminant analysis projects a 3-class discrimination problem onto the two dimensional space shown in FIG. 17. As shown in FIG. 17, a plurality of characteristic amounts are collected from the floor surfaces $F_A$ through $F_C$ and are projected to obtain data distributions. As a result, it is possible to draw boundary settlement lines indicated by solid lines in FIG. 17 between the floor surfaces.

Let us consider that the robot apparatus performs walking control corresponding to the floor surface states with reference to the two dimensional space that is learnt and contains the class boundary settlement lines drawn. A walking motion or the above-mentioned in-place stepping motion is performed to obtain chronological values for the roll axis operation amounts. The values are Fourier transformed into characteristic amounts that are then projected on the two-dimensional space as shown in FIG. 17. Euclidean distances are found from each class center and are compared to each other. Classifying input data into a class showing the shortest distance enables the floor surface category discrimination (class discrimination).

The walking control section is provided with walking control modes such as walking algorithms corresponding to the three floor surface categories, i.e., flooring $F_A$, thin-piled carpet $F_B$, and thick-piled carpet $F_C$. When the floor surface categories are input according to the above-mentioned method, the walking control section computes an adaptive operation amount in accordance with the corresponding walking algorithm. As a result, stable walking is made possible.

The present invention is not limited to the above-mentioned embodiments. It is further understood by those skilled in the art that various changes and modifications may be made without departing from the spirit and scope of the present invention. The above-mentioned embodiment previously classifies floor surfaces into specified categories and learns characteristic amounts for the discrimination input data corresponding to each category. Further, it may be preferable to classify the floor surface categories as follows. A plurality of types of floor surfaces are used to obtain many characteristic amounts (feature vectors) for the discrimination input data. Clustering is performed to divide data (feature vectors) in pattern space into several similar subsets by using similarities based on Euclidean distances or dispersion in the pattern space.

What is claimed is:

1. An autonomously movable legged mobile robot apparatus comprising:
    walking surface discrimination means for discriminating a walking surface category as a current walking surface's category from a plurality of prepared categories based on information about the current walking surface; and
    walking control means for controlling walking by selecting a specified walking control mode in accordance with the walking surface category discriminated by the walking surface discrimination means, wherein
    the walking surface discrimination means has a learned characteristic amount obtained by previously learning a characteristic amount of information about a walking surface for each category classified in accordance with a specified criterion and compares a characteristic amount of information about a current walking surface with the learned characteristic amount so as to discriminate a walking surface category.

2. The robot apparatus according to claim 1, wherein
    the walking control means computes a walking control amount from a sensor value output from a sensor provided for at least a leg based on a selected walking control mode; and
    the walking surface discrimination means uses the walking control amount as information about the current walking surface.

3. The robot apparatus according to claim 2, wherein the walking control means has a different walking control model for each of the categories, selects a walking control model corresponding to the walking surface category to be input, and uses the sensor value to compute a correction amount from the walking control model as the walking control amount.

4. The robot apparatus according to claim 2, wherein the walking control means converts the sensor value into the walking control amount using a specified parameter, has a different parameter for each of the categories, and computes the walking control amount using a parameter corresponding to the walking surface category to be input.

5. The robot apparatus according to claim 1, wherein the walking surface discrimination means uses a sensor value output from a sensor provided for at least a leg as information about the current walking surface.

6. The robot apparatus according to claim 1 comprising:
    an imaging means,
    wherein the walking surface discrimination means extracts a walking surface area from an input image captured by the imaging means and uses the walking surface area as information about the current walking surface.

7. The robot apparatus according to claim 1, wherein the walking surface discrimination means discriminates a walking surface category by means of pattern recognition of information about the current walking surface.

8. An autonomously movable legged mobile robot apparatus, comprising:
    walking surface discrimination means for discriminating a walking surface category as a current walking surface's category from a plurality of prepared categories based on information about the current walking surface; and
    walking control means for controlling walking by selecting a specified walking control mode in accordance with the walking surface category discriminated by the walking surface discrimination means, wherein
    the plurality of categories are obtained by classifying characteristic amounts of information about walking surfaces based on a previously learned characteristic amount; and
    the walking surface discrimination means compares a characteristic amount of information about a current walking surface with the learned characteristic amount to discriminate a walking surface category.

9. The robot apparatus according to claim 1 comprising:
    motion generation means for generating an in-place stepping motion to discriminate the walking surface category.

10. The robot apparatus according to claim 9, wherein
    the walking control means computes a walking control amount from a sensor value output from a sensor provided for at least a leg based on a selected walking control mode during the in-place stepping motion; and
    the walking surface discrimination means uses the walking control amount as information about the walking surface.

11. An autonomously movable legged mobile robot apparatus, comprising:

walking surface discrimination means for discriminating a walking surface category as a current walking surface's category from a plurality of prepared categories based on information about the current walking surface; and walking control means for controlling walking by selecting a specified walking control mode in accordance with the walking surface category discriminated by the walking surface discrimination means, wherein the walking surface discrimination means discriminates a walking surface category by means of pattern recognition of information about the current walking surface;

the walking control means computes a chronological walking control amount from a chronological sensor value output from a sensor provided for at least a leg based on a selected walking control mode; and the walking surface discrimination means uses a characteristic amount equivalent to data resulting from Fourier transforming the chronological walking control amount and performs pattern recognition of the characteristic amount to discriminate a walking surface category.

12. The robot apparatus according to claim 7, wherein the walking surface discrimination means uses a characteristic amount equivalent to data resulting from Fourier transforming a chronological sensor value output from a sensor provided for at least a leg and performs pattern recognition of the characteristic amount to discriminate a walking surface category.

13. The robot apparatus according to claim 1, wherein the walking surface discrimination means continuously discriminates a walking surface category during walking.

14. A walking control method of an autonomously movable legged mobile robot apparatus comprising:

discriminating a walking surface category as a current walking surface's category from a plurality of prepared categories based on information about the walking surface; and controlling walking by selecting a specified walking control mode in accordance with the walking surface category discriminated by the discriminating, wherein the discriminating compares a characteristic amount of information about current walking surface with a learned characteristic amount obtained by previously learning a characteristic amount of information about a walking surface for each category classified in accordance with a specified criterion so as to discriminate a walking surface category.

15. The walking control method of the robot apparatus according to claim 14 comprising:

computing a walking control amount from a sensor value output from a sensor provided for at least a leg based on a selected walking control mode, wherein the discriminating uses the walking control amount as information about the current walking surface.

16. The walking control method of the robot apparatus according to claim 15, wherein the computing, the discriminating, and the controlling are repeated during walking.

17. The walking control method of the robot apparatus according to claim 14, wherein the discriminating uses a sensor value output from a sensor provided for at least a leg as information about the current walking surface.

18. The walking control method of the robot apparatus according to claim 14, wherein the discriminating extracts a walking surface area from an input image captured by imaging means and uses the walking surface area as information about the current walking surface.

19. The walking control method of the robot apparatus according to claim 14, wherein the discriminating discriminates a walking surface category by means of pattern recognition of information about the current walking surface.

20. The walking control method of the robot apparatus according to claim 14, wherein the plurality of categories are obtained by classifying characteristic amounts of information about walking surfaces based on a previously learned characteristic amount; and the discriminating compares a characteristic amount of information about a current walking surface with the learned characteristic amount to discriminate a walking surface category.

21. The walking control method of the robot apparatus according to claim 14 comprising;

generating an in-place stepping motion before the discriminating so as to discriminate the walking surface category.

22. The walking control method of the robot apparatus according to claim 14 comprising:

generating an in-place stepping motion before the discriminating so as to discriminate the walking surface category; and computing a walking control amount from a sensor value output from a sensor provided for at least a leg based on a selected walking control mode during the in-place stepping motion, wherein the discriminating uses the walking control amount as information about the walking surface.

23. The walking control method of the robot apparatus according to claim 14, wherein the discriminating continuously discriminates a walking surface category during walking.

24. An autonomously movable legged mobile robot apparatus comprising:

a walking surface discrimination unit configured to discriminate a walking surface category as a current walking surface's category from a plurality of prepared categories based on information about the current walking surface; and a walking control unit configured to control walking by selecting a specified walking control mode in accordance with the walking surface category discriminated by the walking surface discrimination unit, wherein the walking surface discrimination unit is configured to determine a learned characteristic amount obtained by previously learning a characteristic amount of information about a walking surface for each category classified in accordance with a specified criterion and to compare a characteristic amount of information about a current walking surface with the learned characteristic amount so as to discriminate a walking surface category.

25. An autonomously movable legged mobile robot apparatus, comprising:

a walking surface discrimination unit configured to discriminate a walking surface category as a current walking surface's category from a plurality of prepared categories based on information about the current walking surface; and a walking control unit configured to control walking by selecting a specified walking control mode in accordance with the walking surface category discriminated by the walking surface discrimination unit, wherein the plurality of categories are obtained by classifying characteristic amounts of information about walking surfaces based on a previously learned characteristic amount; and the walking surface discrimination unit is configured to compare a characteristic amount of information about a current walking surface with the learned characteristic amount to discriminate a walking surface category.

26. An autonomously movable legged mobile robot apparatus, comprising:

a walking surface discrimination unit configured to discriminate a walking surface category as a current walking surface's category from a plurality of prepared categories based on information about the current walking surface; and a walking control unit configured to control walking by selecting a specified walking control mode in accordance with the walking surface category discriminated by the walking surface discrimination unit, wherein the walking surface discrimination unit is configured to discriminate a walking surface category by means of pattern recognition of information about the current walking surface;

the walking control unit is configured to compute a chronological walking control amount from a chronological sensor value output from a sensor provided for at least a leg based on a selected walking control mode; and the walking surface discrimination unit is configured to use a characteristic amount equivalent to data resulting from Fourier transforming the chronological walking control amount and to perform pattern recognition of the characteristic amount to discriminate a walking surface category.

* * * * *